United States Patent
Omi et al.

(10) Patent No.: US 9,679,209 B2
(45) Date of Patent: Jun. 13, 2017

(54) STATE MONITORING APPARATUS

(71) Applicant: DENSO CORPORATION, Kariya, Aichi-pref. (JP)

(72) Inventors: Takuhiro Omi, Anjo (JP); Takahiro Yamamoto, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 222 days.

(21) Appl. No.: 14/408,397

(22) PCT Filed: Jul. 22, 2013

(86) PCT No.: PCT/JP2013/004432
§ 371 (c)(1),
(2) Date: Dec. 16, 2014

(87) PCT Pub. No.: WO2014/017061
PCT Pub. Date: Jan. 30, 2014

(65) Prior Publication Data
US 2015/0186737 A1    Jul. 2, 2015

(30) Foreign Application Priority Data

Jul. 25, 2012   (JP) ................................ 2012-164971
Jul. 25, 2012   (JP) ................................ 2012-164973

(51) Int. Cl.
*H04N 9/47* (2006.01)
*G06K 9/00* (2006.01)
(Continued)

(52) U.S. Cl.
CPC .......... *G06K 9/00845* (2013.01); *G01B 11/14* (2013.01); *G03B 11/045* (2013.01);
(Continued)

(58) Field of Classification Search
IPC .................................................. G06K 9/00845
See application file for complete search history.

(56) References Cited

U.S. PATENT DOCUMENTS 5,877,897 A * 3/1999 Schofield ............... H04N 7/183
348/E7.086
2004/0120135 A1   6/2004 Tenmyo
(Continued)

FOREIGN PATENT DOCUMENTS

JP    H08-241409 A    9/1996
JP    H10-078562 A    3/1998
(Continued)

OTHER PUBLICATIONS

Office Action issued Feb. 23, 2016 in the corresponding JP application No. 2012-164971 (with English translation).
(Continued)

*Primary Examiner* — Tracy Y Li
(74) *Attorney, Agent, or Firm* — Posz Law Group, PLC

(57) ABSTRACT

In an image pickup system, illumination light emitted by a light emission part is collected and reflected by an optical member and is distributed to a predetermined area. This light distribution to the predetermined area permits a constituent point farther away from the light emission part to receive illumination light having a greater intensity of light being equal to or greater than a predetermined reference value. The image pickup system thus distributing the illumination light enables the intensity of light incident on each pixel constituting an image pickup predetermined area to be equal to or greater than an intensity reference value while enabling the distribution of the intensity of light incident on each pixel constituting the image pickup predetermined area to be within a first reference range.

23 Claims, 17 Drawing Sheets

(51) Int. Cl.

| | |
|---|---|
| *G03B 15/05* | (2006.01) |
| *G08B 21/06* | (2006.01) |
| *H04N 5/225* | (2006.01) |
| *H04N 5/232* | (2006.01) |
| *G01B 11/14* | (2006.01) |
| *H04N 5/235* | (2006.01) |
| *H04N 5/33* | (2006.01) |
| *G03B 11/04* | (2006.01) |
| *H04N 7/18* | (2006.01) |

(52) U.S. Cl.
CPC ......... *G03B 15/05* (2013.01); *G06K 9/00255* (2013.01); *G08B 21/06* (2013.01); *H04N 5/2256* (2013.01); *H04N 5/2354* (2013.01); *H04N 5/23219* (2013.01); *H04N 5/33* (2013.01); *H04N 7/188* (2013.01); *G03B 2215/0503* (2013.01); *G03B 2215/0567* (2013.01); *G03B 2215/0592* (2013.01); *H04N 5/2251* (2013.01)

(56) References Cited

U.S. PATENT DOCUMENTS

| | | |
|---|---|---|
| 2005/0226472 A1 | 10/2005 | Komura |
| 2006/0110145 A1 | 5/2006 | Fujimoto et al. |
| 2006/0222264 A1* | 10/2006 | Guitarte Perez ... G06K 9/00248 382/296 |
| 2007/0189749 A1* | 8/2007 | Aoki .................... G01S 17/026 396/106 |
| 2008/0186701 A1 | 8/2008 | Omi |
| 2008/0303915 A1 | 12/2008 | Omi |
| 2009/0225156 A1* | 9/2009 | Akiyama ........... A61B 1/00096 348/68 |
| 2010/0020540 A1 | 1/2010 | Tetsuo et al. |
| 2010/0254571 A1 | 10/2010 | Matsuura et al. |
| 2012/0051066 A1 | 3/2012 | Koo et al. |
| 2013/0050426 A1* | 2/2013 | Sarmast .................. G01S 17/89 348/46 |

FOREIGN PATENT DOCUMENTS

| | | |
|---|---|---|
| JP | 2005-271876 A | 10/2005 |
| JP | 2009-071404 A | 4/2009 |
| JP | 2010-129050 A | 6/2010 |
| JP | 2011-069893 A | 4/2011 |
| JP | 2011-130996 A | 7/2011 |
| JP | 2012-028619 A | 2/2012 |
| JP | 2012-089367 A | 5/2012 |
| JP | 2014-026047 A | 2/2014 |

OTHER PUBLICATIONS

Office Action issued Feb. 23, 2016 in the corresponding JP application No. 2012-164973 (with English translation).

International Search Report and Written Opinion of the International Searching Authority mailed Sep. 3, 2013 for the corresponding International application No. PCT/JP2013/004432 (and English translation).

ISO4513. "Road vehicles—Visibility—Method for establishment of eyellipses for driver's eye location." Third edition, May 15, 2010.

IEC (International Electrotechnical Commission) 62471.

"A Circuit-Characteristics Analysis System Capable of Reflecting Lithography Patterns." Open Innovation of AIST. Apr. 16, 2013.

* cited by examiner

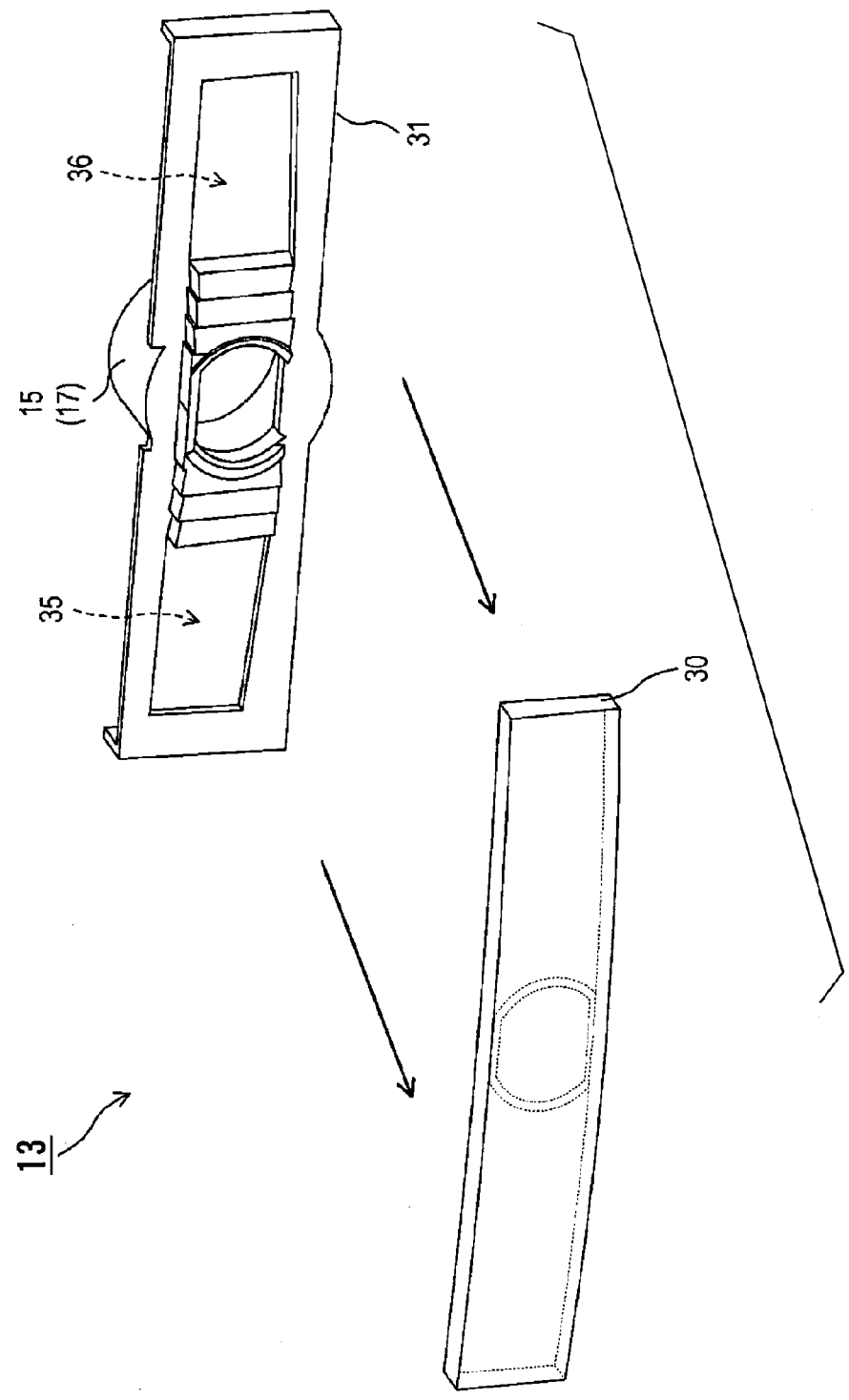

STATE MONITORING APPARATUS

CROSS REFERENCE TO RELATED APPLICATION

This present disclosure is a U.S. national stage application of PCT/JP2013/004432 filed on Jul. 22, 2013 and is based on Japanese Patent Application No. 2012-164971 filed on Jul. 25, 2012 and Japanese Patent Application No. 2012-164973 filed on Jul. 25, 2012, the disclosures of which are incorporated herein by reference.

TECHNICAL FIELD

The present disclosure relates to a state monitoring apparatus that generates a picture image, and an optical member used in the state monitoring apparatus.

BACKGROUND ART

State monitoring apparatuses (so-called driver monitoring systems) have been conventionally known which are mounted in vehicles and monitor the state of the occupants of the vehicles for the purpose of ensuring safe driving of the vehicles (Refer to Patent Literature 1, for example).

This type of state monitoring apparatus includes: an image pickup system that generates a picture image; and a state monitoring portion that monitors the state of the occupant of the host vehicle based on the result obtained by processing the picture image generated at the image pickup system. The image pickup system includes: at least one floodlight projector that emits light (hereafter, referred to as illumination light) of a wavelength including at least near infrared; and a camera that forms an image from the light, which is reflected from the area irradiated with the illumination light by the floodlight projector and incident on a camera lens, using an image sensor having a plurality of pixels and thereby generates a picture image.

The camera used in the image pickup system is installed in an appropriate position together with a lens having such an angle of view providing an image pickup area where the face of an occupant is probably positioned, in consideration of changes in the posture of an occupant of average somatotype sitting on a seat of the host vehicle in ordinary motion during driving. Such an occupant of average somatotype is, for example, of eyellipse 99 percentile defined in "ISO4513 Road vehicles-Visibility-Method for establishment of eyellipses for driver's eye location" or "JIS D 0021 Eye Range of Drivers for Automobiles". Stably monitoring the state of occupants using such a camera requires acquiring continuously picture images of the brightness and contrast suitable for image processing in a state monitoring portion from the image pickup area, by projecting as uniformly as possible the illumination light having a predetermined intensity reference value or higher to an object to be imaged. Eyellipse is the abbreviation of eye and ellipse and is used to plot the statistical distribution of the positions of eyes.

PRIOR ART LITERATURES

Patent Literature

Patent Literature 1: JP 2005-271876 A

Projecting uniform illumination light of an intensity reference value or higher to an image pickup area may employ a plurality of floodlight projectors. Those floodlight projectors may be installed in a plurality of different places or in a single place. The plurality of light sources included in the floodlight projectors, for example, LED light sources may be installed in an array.

The above technique may increase the area occupied by the floodlight projectors, the size of the entire system, or the number of the floodlight projectors in the image pickup system. This eventually increases the power consumption in the floodlight projectors.

That is, a conventional state monitoring apparatus, which projects uniform illumination light of an intensity reference value or higher to an image pickup area, carries out light emission useless for the system, to thereby project light also to an area different from the image pickup area. This increases the number of floodlight projectors and the size of the entire apparatus and prevents reduction in the power consumption in the floodlight projectors.

SUMMARY OF INVENTION

It is an object of the present disclosure to provide a state monitoring apparatus to project uniform illumination light of an intensity reference value or higher to an image pickup area as much as possible and suppress increase in the size of the entire apparatus and the power consumed at a floodlight projector as much as possible. It is also an object thereof to provide the state monitoring apparatus to generate a picture image that enables a stable monitoring of the state of occupant.

To achieve the above object, according to an example of the present disclosure, a state monitoring apparatus mounted in a vehicle is provided as follows. The state monitoring apparatus includes at least one light emission part state, an image pickup part, a state monitoring section, and an optical control part. The light emission part emits light to project illumination light having a wavelength including at least a near infrared wavelength to a predetermined area that is defined as an area where a face of an occupant of the vehicle is positioned in space in a compartment of the vehicle. The image pickup part generates a picture image by receiving light incident from the predetermined area with an image sensor having a plurality of pixels. The state monitoring section monitors a state of the occupant based on a result of processing the picture image generated by the image pickup part. The optical control part controls light distribution to permit an intensity of light incident on each pixel included in an image pickup predetermined area to be equal to or greater than an intensity reference value that is predetermined as an intensity of light providing a picture image suitable for image processing by the state monitoring section while permitting a distribution of the intensity of light incident on each pixel included in the image pickup predetermined area to be within a predetermined first reference range. Herein, the image pickup predetermined area is an area that is at least a part of a light receptive surface of the image sensor in the image pickup part, and corresponds to the predetermined area.

According to another example of the present disclosure, a state monitoring apparatus mounted in a vehicle is provided as follows. The state monitoring apparatus includes at least one light emission part, an image pickup part, a state monitoring part, and an optical control part. The light emission part emits light to project illumination light having a wavelength including at least a near infrared wavelength to a predetermined area that is defined as an area where a face of an occupant of the vehicle is positioned in space in a compartment of the vehicle. The image pickup part generates a picture image by receiving light incident from the predetermined area with an image sensor having a plurality of pixels. The state monitoring part monitors a state of the occupant based on a result of processing the picture image generated by the image pickup part. The optical control part includes an incident part that collects the illumination light projected by the light emission part, and a projecting part that performs, at a projecting surface, light distribution that projects the illumination light collected by the incident part to space in the compartment. The projecting part permits an intensity of light incident on each pixel included in an image pickup predetermined area to be equal to or greater than an intensity reference value predetermined as an intensity of light providing a picture image suitable for image processing by the state monitoring part while permitting a distribution of the intensity of light incident on each pixel included in the image pickup predetermined area to be within a predetermined first reference range. Herein, the image pickup predetermined area is an area that is at least a part of a light receptive surface of the image sensor in the image pickup part and corresponds to the predetermined area.

According to yet another example of the present disclosure, an optical member used in a state monitoring apparatus mounted in a vehicle is provided as follows. The state monitoring apparatus includes at least one light emission part, an image pickup part, and a state monitoring part. The light emission part emits light to project illumination light having a wavelength including a near infrared wavelength to a predetermined area defined as an area where a face of an occupant of the vehicle is positioned in space in a compartment of the vehicle. The image pickup part generates a picture image by receiving light incident from the predetermined area with an image sensor having a plurality of pixels. The state monitoring part monitors a state of the occupant based on a result of processing the picture image generated by the image pickup part. The optical member includes an incident part and a projecting part. The incident part collects illumination light emitted projected by the light emission part. The projecting part performs, at a projecting surface, light distribution that projects the illumination light collected by the incident part to the space in the compartment. The projection part permits an intensity of light incident on each pixel included in an image pickup predetermined area to be equal to or greater than an intensity reference value predetermined as an intensity of light providing a picture image suitable for image processing by the state monitoring part while permitting a distribution of the intensity of light incident on each pixel included in the image pickup predetermined area to be within a predetermined first reference range. Herein, the image pickup predetermined area is an area that is at least a part of a light receptive surface of the image sensor in the image pickup part and corresponds to the predetermined area.

BRIEF DESCRIPTION OF DRAWINGS

The above and other objects, features and advantages of the present disclosure will become more apparent from the following detailed description made with reference to the accompanying drawings. In the drawings:

FIG. 19 is a drawing illustrating a modification of an optical member.

EMBODIMENTS FOR CARRYING OUT INVENTION

Hereafter, a description will be given to embodiments of the present disclosure with reference to the drawings.

First Embodiment

<1.1 State Monitoring Apparatus>

Figure 1:
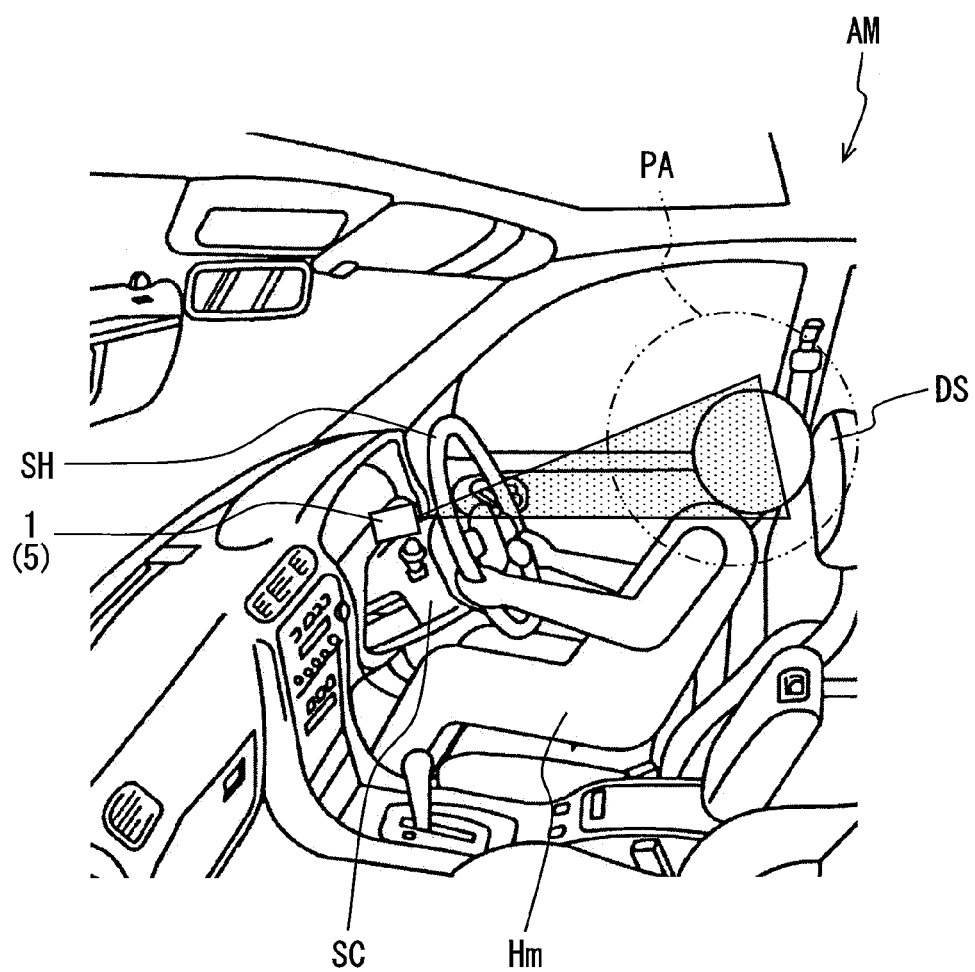
FIG. 1 is a drawing illustrating the installation position of a state monitoring apparatus to which an embodiment of the present disclosure is applied.

As illustrated in FIG. 1, the state monitoring apparatus 1 is a so-called driver monitoring system that is intended to achieve safe running of an automobile AM or a driving environment comfortable for occupants. The state monitoring apparatus 1 monitors the state of an occupant Hm based on a picture image embracing the head of the occupant (driver in this embodiment) Hm of a host vehicle AM.

Figure 2:
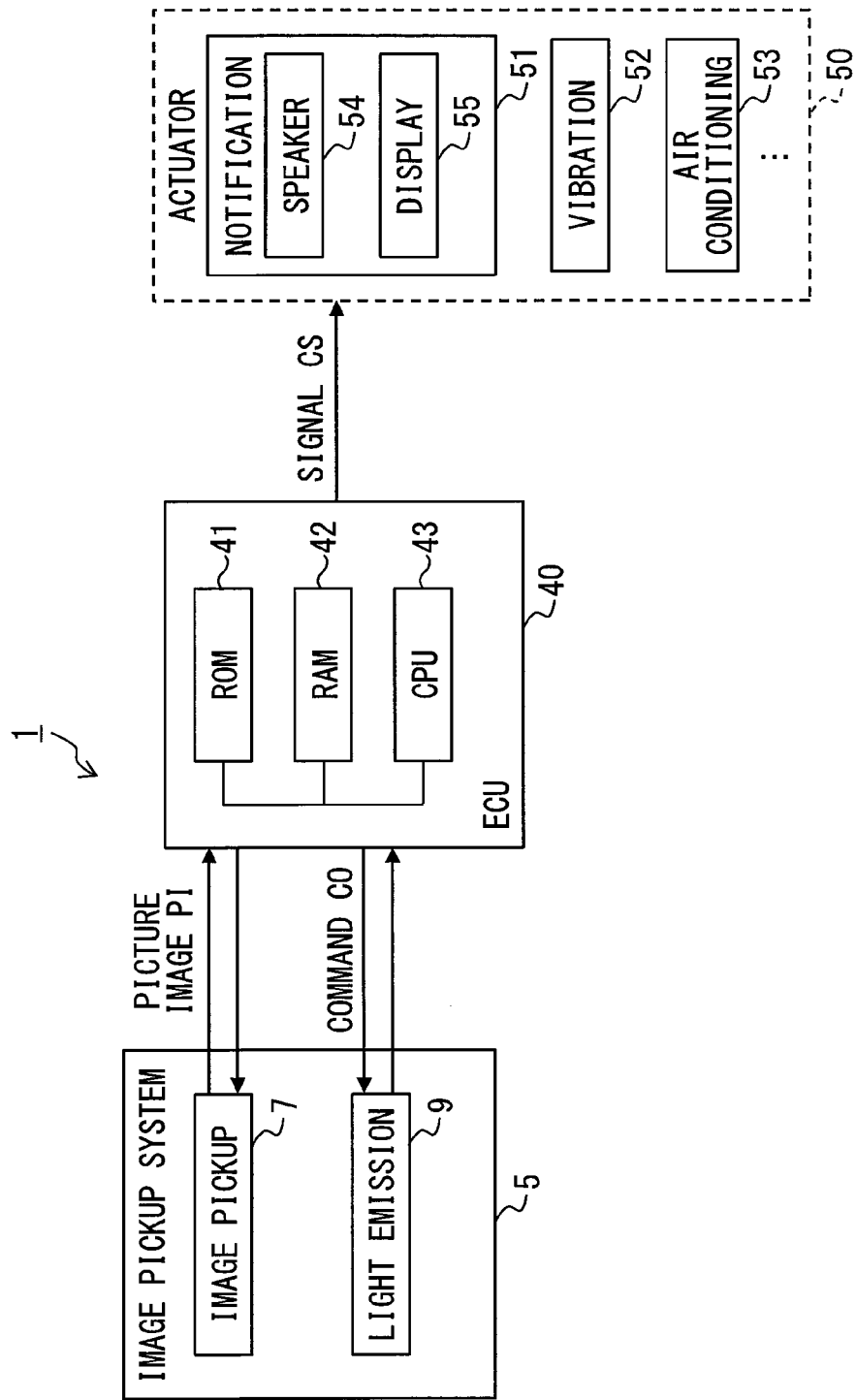
FIG. 2 is a block diagram illustrating the schematic configuration of a state monitoring apparatus.

As illustrated in FIG. 2, this state monitoring apparatus 1 includes: an image pickup system 5 that generates a picture image PI; and a state monitoring ECU (Electronic Control Unit) 40 that carries out picture image recognition processing with respect to the picture image PI to monitor the state of the occupant Hm. Further, an actuator part 50 containing various apparatuses mounted in the host vehicle AM is connected to the state monitoring apparatus 1.

Figure 3:
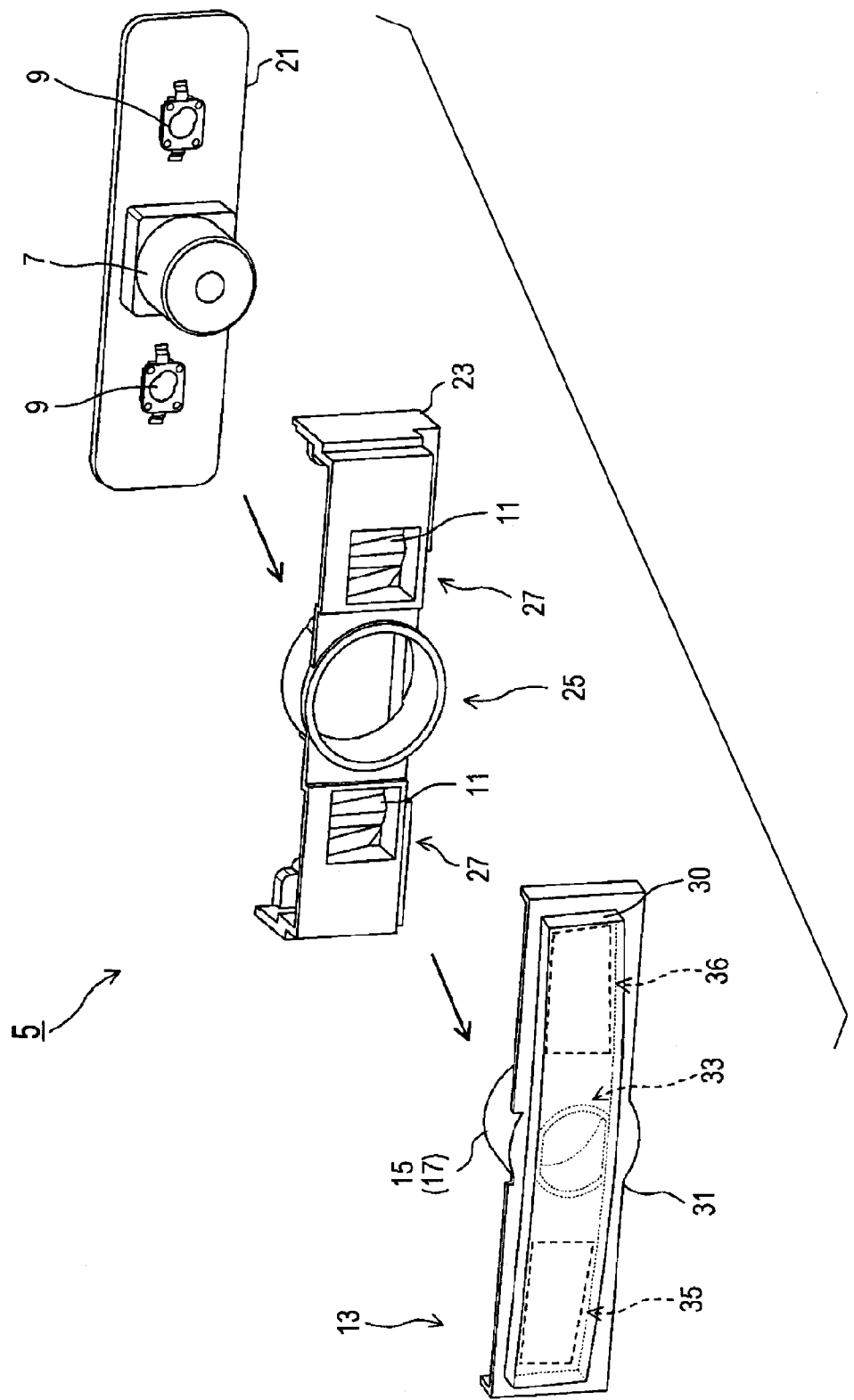
FIG. 3 is a perspective view illustrating the structure of an image pickup system.

The image pickup system 5 emits light (hereafter, referred to as illumination light) of a wavelength including at least a wavelength in the near infrared range and generates picture images PI. As illustrated in FIG. 3, the image pickup system 5 includes: an image pickup part 7; light emission parts 9 (also each referred to as floodlight projector 9); optical members 11 (also each referred to as optical element, optical control part or device, or optical part or device); an optical member 13; and a substrate 21. The image pickup part 7 functions as an image pickup device and the light emission part 9 functions as a light emission device.

The image pickup system 5 is installed in an installation position predetermined so that the following area is taken as the image pickup area: an area embracing an area (hereafter, referred to as predetermined area PA (Refer to FIG. 1)) in the vehicle compartment space where the head of the occupant Hm of the host vehicle AM can be positioned. The predetermined area PA in this embodiment is, for example, an area embracing an elliptic area (that is, eyellipse) indicating the position where the eyes of the driver in an ordinary driving posture exist. This predetermined area PA only has to be defined beforehand from the eyellipse in terms of design and is, as viewed from the image pickup part 7, the area in proximity to the head rest of the driver's seat DS. The area embraced in the predetermined area PA may be 99 percentile or 95 percentile of the eyellipse.

Usually, eyellipse is uniquely defined by the seat position. There is a vehicle that is different in the range of the position where the seat position can be set, from ordinary ranges of the position. Such a vehicle may be determined to have a predetermined area PA that does not actually contain the head of the occupant Hm.

Consequently, the predetermined area PA need not be determined from the eyellipse in terms of design and may be experimentally determined from the distribution of the area where the head of each occupant Hm is positioned when the occupant Hm (subject) is seated in a seat in an ordinary posture during driving. (Refer to FIG. 13.) Specifically, for example, a predetermined area PA may be determined to be a range embracing an area in a predetermined ratio or above in the distribution of the area where the head of each occupant Hm is positioned. It is noted that many occupants Hm (subjects) cited here may be desirably various persons different in such parameters as race, sex, age.

Figure 13:
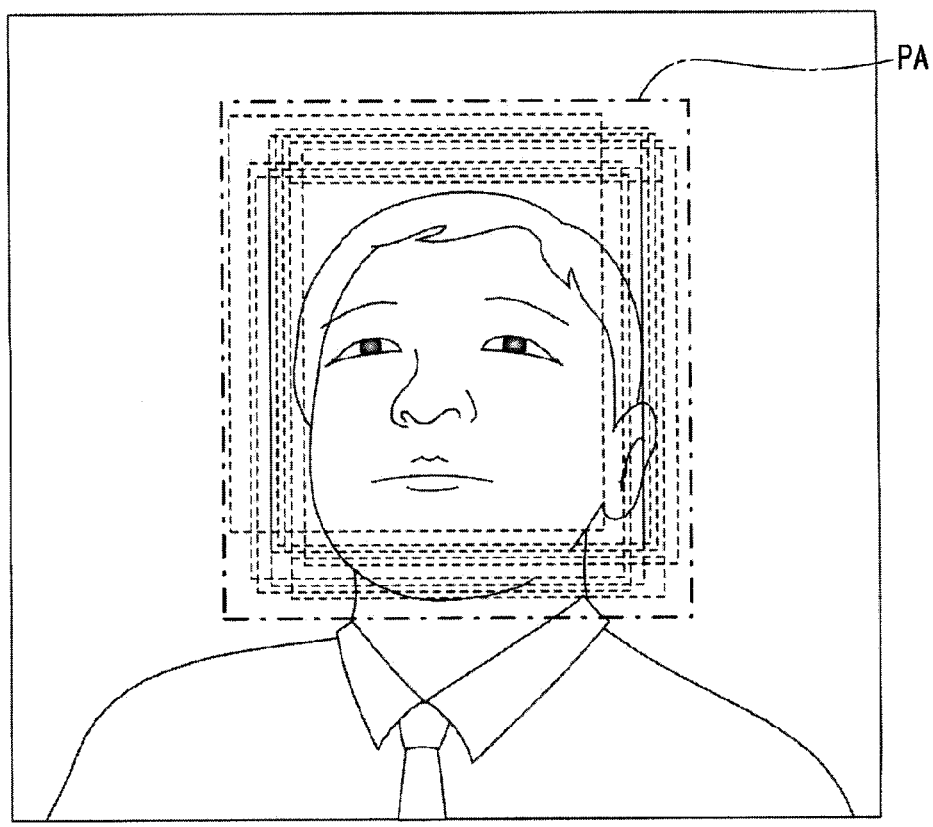
FIG. 13 is an explanatory drawing illustrating a modification of a setting method for a predetermined area.

In FIG. 13, each of the rectangular areas indicated by broken lines shows the areas where the head of the subject is positioned based on the results of image pickup obtained when the subjects different in race, sex, and age set their driving position in a posture suitable for their respective driving. The rectangular area indicated by an alternate long and short dashed line is the area (that is, predetermined area PA) where the head of an occupant Hm of the host vehicle AM can be positioned.

When this method is used to determine the predetermined area PA, it is possible to reduce the possibility that an area where the head of an occupant Hm is not actually positioned is determined as the predetermined area PA. It is noted that the predetermined area PA should not be limited to an ordinary driving posture but should be determined with the movement of the face to some degree in conjunction with driving action taken into account.

Figure 5:
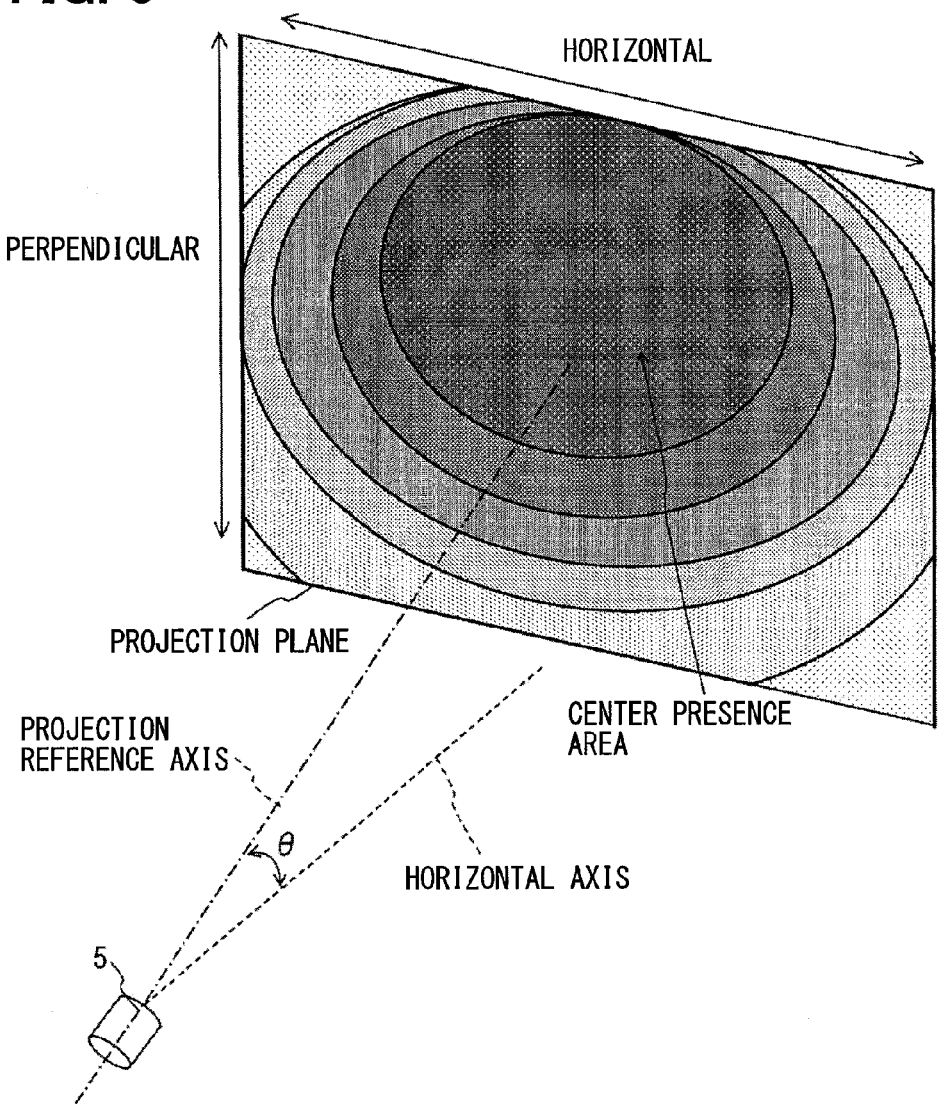
FIG. 5 is a drawing showing light distribution characteristics controlled by an optical member.

The installation position in this embodiment is an outer surface of the upper side of the steering column SC connected to the steering wheel SH. When the image pickup system 5 is installed in such an installation position, a predetermined angle (elevation angle) is provided between the central axis (projection reference axis: Refer to FIG. 5) of the image pickup system 5 and the horizontal axis (Refer to FIG. 5).

The image pickup part 7 is a publicly known image pickup apparatus including peripheral electronic circuits, such as an image sensor (image sensor such as so-called CCD and CMOS), an optical lens, an optical filter, an oscillator, an interface circuit, a power source. Each pixel receives light incident on the image sensor through the optical lens, and a picture image PI is generated which is shaded in accordance with the differences in intensity of the light.

The image pickup part 7 in this embodiment actively controls such parameters as gain, exposure time automatically or manually in accordance with the surrounding environment. In addition, the image pickup part is provided with a communication function so as to optionally set image pickup timing. The image sensor desirably uses an element high in sensitivity to near infrared light.

The light emission part 9 is a light emitter that emits illumination light in accordance with a control command CO from the state monitoring ECU 40. The light emission parts 9 in this embodiment is each of two light emitting diodes (LEDs (Light Emitting Diodes)).

The optical member 11 collects and reflects illumination light from the light emission part 9 and distributes the collected illumination light to the predetermined area PA. The substrate 21 is a printed board where electronic components are mounted and a wiring is formed. The image pickup part 7 is fixed substantially at the center of the substrate and one or more light emission parts 9 are fixed in positions appropriately away from the image pickup part 7.

A part 23 has a mechanism for connection to the substrate 21. In this part 23, a hole (hereafter, referred to as first insertion hole) 25 for inserting the image pickup part 7 is formed in the position opposed to the position where the image pickup part 7 is fixed in the substrate 21. The part 23 is further provided with holding structures for holding the optical member 11 in predetermined positional relation. The holding structures are provided in the positions opposed to the positions where the light emission parts 9 are fixed in the substrate 21. The positional relation between the light emission parts 9 and the optical members 11 is important as the projection characteristics of the floodlight projectors. If misregistration occurs therebetween, sufficient performance cannot be obtained; therefore, a positioning pin or the like is used to compensate misregistration accuracy between the substrate 21 and the part 23. The part 23 and the optical members 11 may also be formed by integral molding.

The optical member 13 removes unwanted light in the illumination light passing through the optical members 11 and blocks and prevents the light emitted from the light emission parts 9 from being incident on the image pickup part 7 by internal reflection. The optical member 13 includes a visible light cut filter 30 and a shade 31 and integrated by two-color molding or the like. Therefore, the optical member 13 functions also as a filter portion or filter device.

The visible light cut filter 30 (also referred to as filter portion or filter device) is an optical filter formed into a rectangular plate as a whole and is formed of such a material that the following are implemented: at least much of a component (for example, a wavelength in the near infrared range) of light predetermined as a component of light suitable for image processing at the state monitoring ECU 40, that is, light of the wavelength component of the floodlight projectors is passed through; and visible light unwanted for the image pickup part 7 is cut as much as possible to make the light emission parts 9 less prone to direct viewing from the driver Hm.

The shade 31 has a holding structure holding the visible light cut filter 30. In this shade 31, a hole (hereafter, referred to as second insertion hole) 33 for inserting the image pickup part 7 is formed in the position opposed to the position where the image pickup part 7 is fixed in the substrate 21. Further, openings 35, 36 are formed in the positions opposed to the respective optical members 11 so that light projected from the optical members 11 are passed through.

The optical member 13 is placed on the illumination light path from the light emission parts 9 to the predetermined area PA so that the image pickup part 7 and the light emission parts 9 (optical members 11) are covered therewith. The shade 31 is made of a light shielding material that prevents the passage of light including near infrared light. The shade 31 includes a light shielding portion 15 that prevents illumination light emitted from the light emission parts 9 from being incident on the image pickup part 7 as light more intensive than necessary by surface reflection, internal propagation, or the like.

Figure 4:
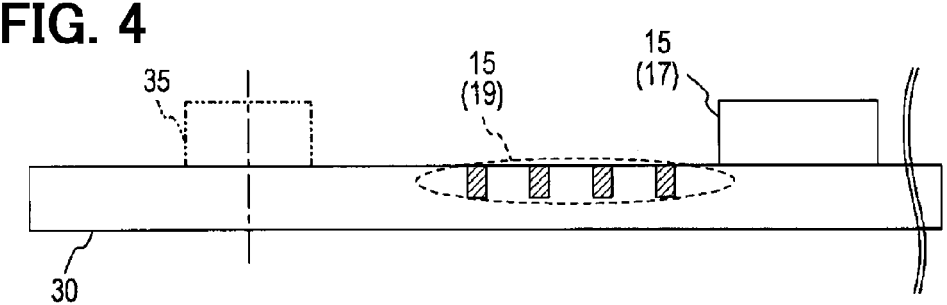
FIG. 4 is a drawing illustrating the structure of an attenuating portion of an optical (filter) member.

This embodiment is provided as one of the light shielding portion 15 with a cylindrical light shielding portion 17 fit and inserted into the first insertion hole 25 so as to cover the circumference of the image pickup part 7. Further, as illustrated in FIG. 4, this embodiment is provided as one of the light shielding portion 15 with an attenuating portion 19 that attenuates illumination light unintentionally propagating through the optical member 13. The attenuating portion 19 is formed in each of the areas from the openings 35, 36 to the second insertion hole 33 of the shade 31 on at least either of the upper side and lower side of the visible light cut filter 30. When the visible light cut filter 30 is in the form of a plate having a certain thickness, the following takes place: the attenuating portion 19 lets light incident from a specific direction repetitively go straight and be reflected at the medium interface of the visible light cut filter 30 and regularly internally propagate. The shape is also referred to labyrinth in that the shape blocks the path and the shape of the installation interval thereof is determined from the thickness of the visible light cut filter and the angle of incidence of light in terms of design. There are cases where the deeper attenuating portions 19 are more favorable but it is required to design them to the extent that the mechanical strength of the visible light cut filter 30 is not degraded. The areas hatched in FIG. 4 are formed as a plurality of cavities. Or, the hatched areas are formed of a member different in index of refraction from the other areas.

The attenuating portion 19 is not limited to the cavities formed at equal intervals as shown in the drawing. The attenuating portion may be sawtooth cuts formed in the optical member 13 or may be formed by enhancing the reflection coefficient with which the illumination light formed in the optical member 13 is reflected or may be configured by a combination thereof. Each of the light shielding portion 15, the light shielding portion 17, and the attenuating portion 19 functions also as an incidence reducing portion or incidence reducing device that reduces incident light.

<1.2 Light Distribution by Optical Member>

The light distribution by the optical members 11 is carried out so that the following are implemented: the intensity of light incident on each pixel included in the image pickup predetermined area is equal to or higher than an intensity reference value predetermined as the intensity of light providing a picture image PI suitable for image processing at the state monitoring ECU 40; and the distribution of the intensity of light incident on each pixel included in the image pickup predetermined area is within a predetermined first reference range. The image pickup predetermined area cited here refers to an area on which light from the predetermined area PA is incident on the light receptive surface in the image sensor of the image pickup part 7. The amount of light received in the image pickup predetermined area differs depending on the shape or reflection coefficient of a subject present in the predetermined area PA. Therefore, the description is given on the assumption that a plane perpendicular and giving a constant reflection coefficient as viewed from any angle exists in the predetermined area PA. The first reference range cited here refers to a range within which the distribution of the intensity of light may be considered to vary at a minimum suitably for image processing.

To obtain the above-mentioned light incidence in the light receptive surface of the image sensor, the light distribution by the optical members 11 in this embodiment is carried out as shown in FIG. 5. That is, the light is distributed so that the intensity of illumination light is higher in an area closer to the center presence area and is lower in an area farther away from the center presence area in the horizontal direction.

The center presence area cited here refers to an area where the center (central axis) of the face of the occupant is probably positioned in a projection plane. The projection plane is, for example, a perpendicular plane that defines an area containing the predetermined area PA and a virtual plane that divides the traveling direction of the vehicle into forward and rearward. While the predetermined area PA is a three-dimensional space, the projection plane is a two-dimensional plane for the sake of convenience. The description will be given on the assumption that the reflectance properties of the front face of a flat plate are not directional. There is a high possibility that in this projection plane, there is the face (head) of the occupant Hm in the predetermined area PA.

Further, the light distribution by the optical members 11 in the center presence area is carried out so that the distribution of the intensity of illumination light is uniform in the predetermined area PA in the perpendicular direction. "Uniform" cited here refers to, for example, that the distribution of the intensity of illumination light is within a predetermined second reference range.

In FIG. 5, areas where the intensity of arriving illumination light is higher are more densely hatched and areas where the intensity of arriving illumination light is lower are more sparsely hatched.

In the example shown in FIG. 5, the range, including the center presence area, within which the intensity of illumination light varies stepwise is shown by elliptic shape. However, the range within which the intensity of illumination light varies stepwise shown in FIG. 5 is an example and is not limited to elliptic shape. Further, in the example shown in FIG. 5, the variation of the intensity of illumination light is represented stepwise; however, the variation of the intensity of illumination light is actually continuous and smooth.

<1.3 Light Distribution by Optical Member>

To obtain this light distribution, the optical members 11 in this embodiment are provided with a projecting part. The projecting part distributes illumination light incident from the light emission parts 9 so that the following is implemented with respect to a plurality of fine areas (hereafter, referred to as constituent points) constituting the projection plane: the intensity of illumination light arriving at the constituent points is higher at constituent points farther away from the light emission parts 9 (or the image pickup part 7).

The projecting parts of the optical members 11 increase more the amount of light arriving at constituent points farther away from the light emission parts 9 (or the image pickup part 7).

The optical members 11 in this embodiment are provided by an optical element and can be implemented, for example, by at least one of a publicly known lens, prism, mirror, and diffraction gating or a combination thereof.

In the image pickup system 5, as described up to this point, illumination light emitted by the light emission parts 9 is distributed through the optical members 11 with respect to the predetermined area PA. This light distribution with respect to the predetermined area PA is carried out so that the following is implemented: the intensity of illumination light arriving at the projection plane is equal to or higher than a reference value and the intensity of illumination light arriving at a constituent point farther away from the light emission parts 9 becomes higher.

At the image pickup part 7 of the image pickup system 5, a picture image PI is formed from the light incident on the image sensor through the optical lens. The image pickup system 5 in this embodiment takes the predetermined area PA as the image pickup area. Therefore, the picture image PI generated by the image pickup part 7 usually embraces the head (face) of the occupant Hm of the host vehicle AM.

In addition, in the image pickup system 5, the illumination light is distributed as mentioned above. Consequently, the intensity of light incident on each pixel constituting the image pickup predetermined area is equal to or higher than the intensity reference value. At the same time, the distribution of the intensity of light incident on each pixel constituting the image pickup predetermined area is within the first reference range.

<1.4 State Monitoring ECU>

As illustrated in FIG. 2, the state monitoring ECU 40 includes a publicly known microcomputer including a ROM 41, RAM 42, and CPU 43.

The ROM 41 is a storage device holding stored data and programs that must be held even after power supply is turned off. The RAM 42 temporarily stores data. The CPU 43 is a processor that performs processing in accordance with programs stored in the ROM 41 or the RAM 42.

The ROM 41 holds the programs for the CPU 43 to perform state monitoring processing. The state monitoring processing is such that: when the result of monitoring the state of the occupant Hm reveals that the occupant Hm is in a less safe state with respect to driving of the host vehicle AM, attention is called or a warning is issued. Safe driving of the host vehicle AM is thereby ensured. For this purpose, the actuator part 50 is controlled to influence the occupant Hm.

That is, the state monitoring ECU 40 (also referred to as state monitoring part 40) in this embodiment carries out the following based on the result of image processing with a picture image PI generated at the image pickup part 7: the state monitoring ECU 40 monitors the state of the occupant Hm of the host vehicle AM and controls the image pickup system 5. Further, the state monitoring ECU 40 controls the actuator part 50 based on the result of monitoring the state of the occupant Hm of the host vehicle AM.

The actuator part 50 includes a notification part 51, a vibration part 52, and an air conditioning controller 53. The vibration part 52 includes: a seat vibration part that is built in seats (including the driver's seat DS in this embodiment) of the host vehicle AM and vibrates the seats in accordance with a control signal CS from the state monitoring ECU 40; and a steering vibration part (not shown) that vibrates the steering wheel SH in accordance with a control signal CS. The air conditioning controller 53 controls an air conditioner mounted in the host vehicle AM.

The notification part 51 is a mechanism that makes a notification in accordance with a control signal CS from the state monitoring ECU 40 and includes a speaker part 54 and a display part 55. The speaker part 54 is a mechanism that outputs a sound and the display part 55 is a mechanism that shows different information in varied display modes (for example, liquid crystal display and indicator).

Figure 6:
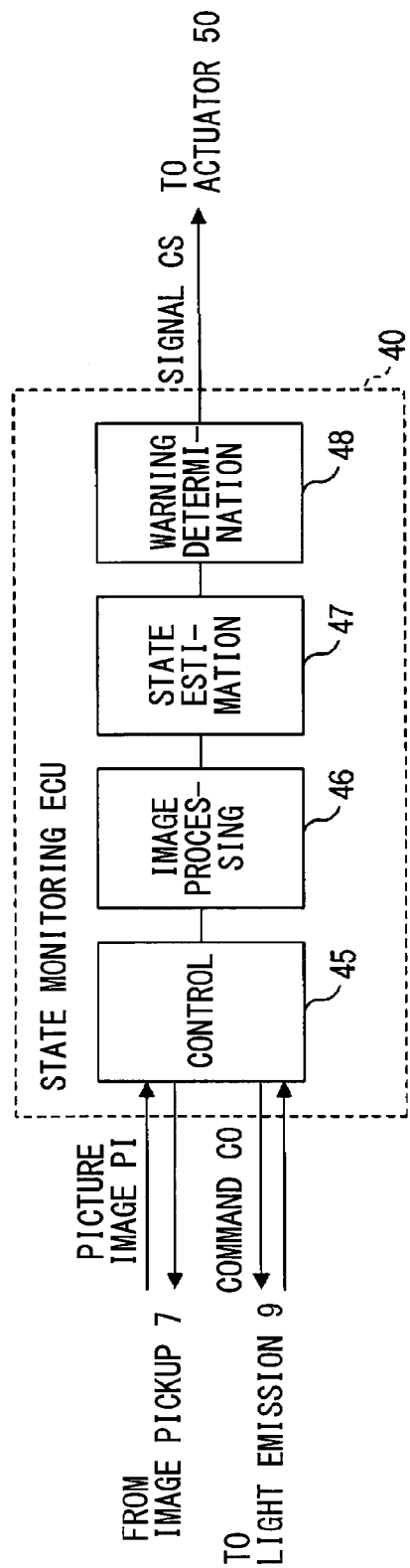
FIG. 6 is a functional block diagram of a state monitoring ECU.

As illustrated in FIG. 6, the state monitoring ECU 40 that has performed state monitoring processing functions as: a control part 45 that controls at least either of the emission of illumination light by the light emission parts 9 and the generation of a picture image PI by the image pickup part 7; an image processing part 46 that performs image processing with a picture image PI; a state estimation part 47 that estimates the state of the occupant Hm of the host vehicle AM based on a picture image PI processed at the image processing part 46; and a warning determination part 48 that controls the actuator part 50 based on the result of estimation at the state estimation part 47.

<1.5 State Monitoring Processing>

The state monitoring processing is started when power is supplied to the state monitoring apparatus 1 (when the ignition switch is turned on in this embodiment).

The flowchart described in this application or the processing in the flowchart includes a plurality of sections (or referred to as steps) and each section is expressed as, for example, S110. Each section may be divided into a plurality of sub sections. Contrarily, a plurality of sections may be combined into one section. Each section configured as mentioned above may be referred to as device, module, or means.

Figure 7:
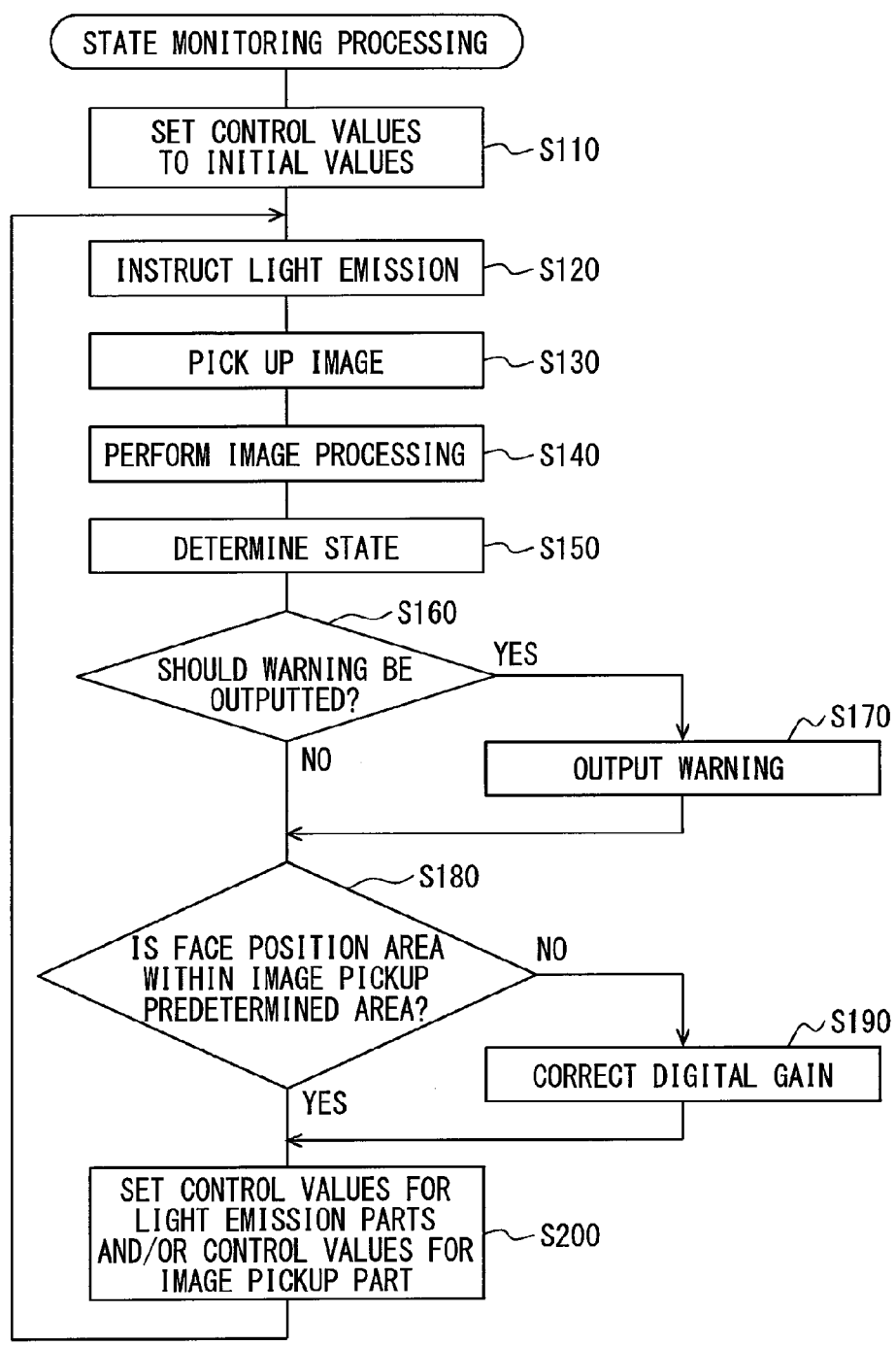
FIG. 7 is a flowchart showing a procedure of state monitoring processing.

When this state monitoring processing is started, as shown in FIG. 7, the control values for the light emission parts 9 and the control values for the image pickup part 7 are set to predetermined initial values (S110).

The control values for the light emission parts 9 cited here includes at least the level (intensity) of illumination light outputted by the light emission parts 9. More specifically, it is controlled by energizing time (current application time) or energy per unit time with which the floodlight projectors are energized (receive current application). This control value of the level of illumination light has a certain control range and at least the upper limit value of the control range is predetermined so that the following should be implemented when the emission light arrives at the face of the occupant Hm: it should be equal to or lower than the Exempt level (for example, Symbol $L_R$, $L_{IR}$, or $E_{IR}$ in Table 6.1 Emission limits for risk groups of continuous wave lamps) stipulated in IEC (International Electrotechnical Comission) 62471.

Further, the control values for the image pickup part 7 includes light exposure time, gain, and the like; and setting ranges of the control values determined beforehand from experiments or the like so that picture images PI suitable for image processing can be picked up are stipulated.

Subsequently, a control command CO is outputted to the light emission parts 9 (S120). This makes the light emission parts 9 emit light and the predetermined area PA is irradiated with the illumination light. Subsequently or simultaneously, the image pickup part 7 is caused to pick up an image to acquire a picture image PI (S130).

Figure 8:
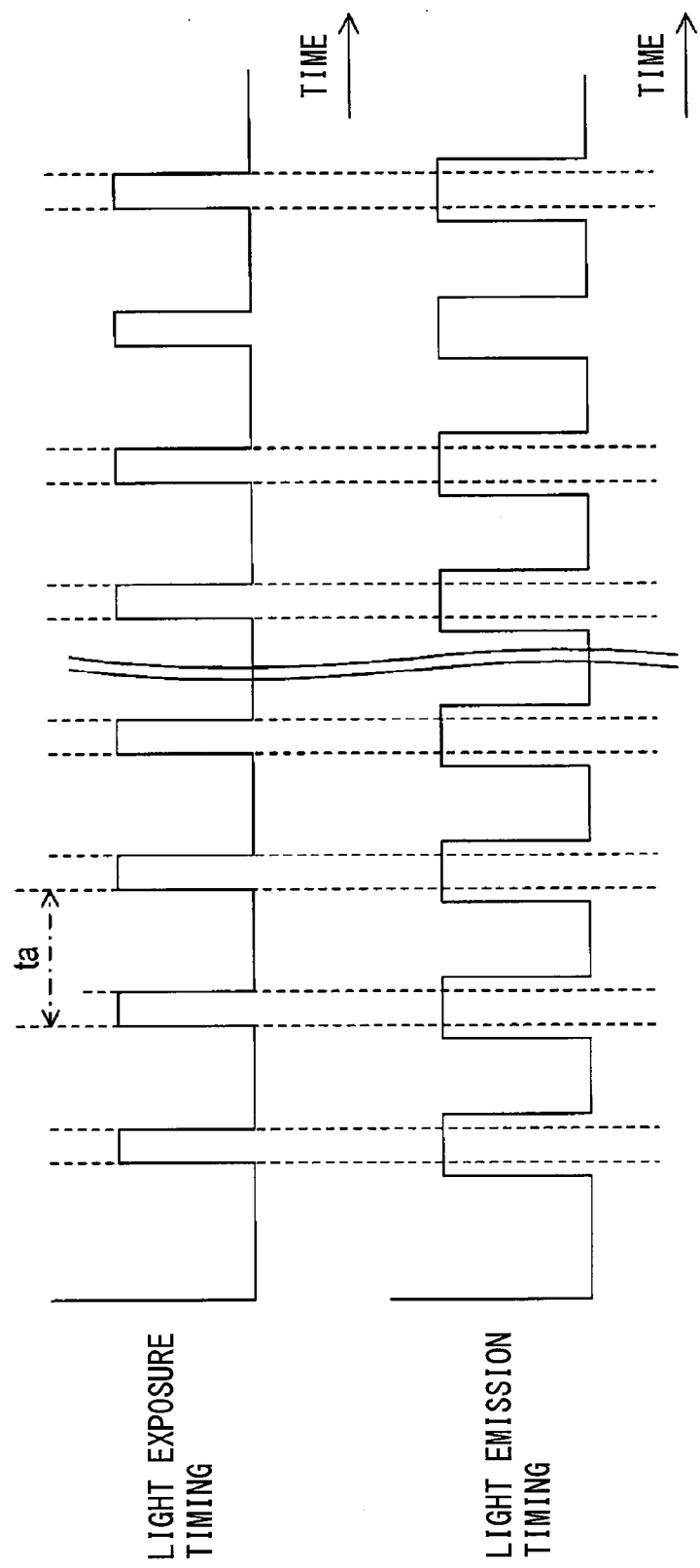
FIG. 8 is an explanatory drawing showing light exposure timing and light emission timing.

In this embodiment, the timing with which the light emission parts 9 emit light and the timing with which the image pickup part 7 picks up a picture image PI are specified as shown in FIG. 8. That is, the duration (light emission timing in the drawing) for which illumination light is emitted from the light emission parts 9 is longer than the light exposure duration (light exposure timing in the drawing) of the image pickup part 7. In addition, the pickup (from the start of light exposure to the end of light exposure) of a picture image PI by the image pickup part 7 is carried out during a period for which the light emission parts 9 emit near infrared light. Symbol to in the drawing denotes the time intervals at which a picture image PI is picked up by the image pickup part 7 and is equivalent to the time intervals at which S120 is performed in a series of cycle from S120 to S200 in FIG. 7. In the above description, the light emission duration is longer than the light exposure duration. This is because the time lag from when start of light emission is instructed to when the floodlight projectors actually emit light with 100% power is taken into account. Simultaneous light emission and light expose may be applied to a light emission device having floodlight projectors that are steeply started up without delay. The timing with which the light emission parts are turned off need not be delayed because of the same reason as mentioned above and it may be simultaneous with or slightly ahead of the end of light exposure.

Image processing is carried out with the picture image PI picked up at S130 for the purpose of monitoring the state of the occupant Hm (S140). The image processing carried out at S140 includes: publicly known image processing (hereafter, referred to as face position identification processing) for identifying the position of the head of the occupant Hm in the picture image PI; publicly known image processing for identifying the degree of opening of the eyes of the occupant Hm; and publicly known image processing for detecting the direction of the line of sight of the occupant Hm.

In the face position identification processing in this embodiment, the left and right ends of the face of the occupant Hm taken in the picture image PI are detected; and each part (eyes, mouth, nose, or the like in this example) that is located in the area sandwiched between the detected left and right ends and constitutes the face is detected. The positional relation between the individual parts and the center of the face of the occupant Hm in the picture image PI is detected to identify the position of the head of the occupant Hm. In face position identification processing, generally, a head model (Refer to FIG. 12) cylindrically representing a human head is also used to identify the position of the head of an occupant Hm.

The following processing is performed as a state determination to determine the state of the occupant Hm based on the result of the image processing at S140 (S150): publicly known processing for estimating the degree of arousal of the occupant Hm; and publicly known processing for determining whether or not the driver takes his/her eyes off the road. As mentioned above, it may also be said that this state monitoring ECU 40 functions as a state monitoring section at S140 to S150.

Subsequently, it is determined whether or not a warning should be outputted in the compartment of the host vehicle AM based on the result of the state determination at S150 (S160). The determination at S160 in this embodiment is made, for example, as described below. When the degree of arousal of the occupant Hm is lower than a predetermined threshold value (that is, the occupant Hm is drowsy) or when the occupant Hm takes his/her eyes off the road, it is considered that a warning should be outputted.

When the result of the determination at S160 reveals that a warning should be outputted (S160: YES), a control signal CS is outputted to the actuator part 50 to output a warning (S170).

When the degree of arousal of the occupant Hm is lower than the threshold value, a warning is outputted at S170 in this embodiment. Examples of this warning are as follows: outputting a notification urging to take a rest from the notification part 51; vibrating the driver's seat DS or the steering wheel SH through the vibration part 52; blowing cold air on the occupant Hm through the air conditioning controller 53; and the like. When the occupant Hm takes his/her eyes away from the road, a warning is outputted at S170 in this embodiment. Examples of this warning are as follows: outputting a voice notification from the notification part 51; vibrating the driver's seat DS or the steering wheel SH through the vibration part 52; blowing cold air on the occupant Hm through the air conditioning controller 53. Thereafter, the processing proceeds to S180.

When the result of the determination at S160 reveals that a warning need not be outputted (S160: NO), the processing of S170 is not performed and the processing proceeds to S180.

At S180, it is determined whether or not every pixel constituting the head (hereafter, referred to as face position area) of the occupant Hm in the picture image PI identified by the face position identification processing performed at S140 is within the following area: an area on the image sensor corresponding to the image pickup predetermined area. When the result of the determination at S180 reveals that all the pixels constituting the face position area are not within the area on the image sensor corresponding to the image pickup predetermined area (S180: NO), the processing proceeds to S190. As mentioned above, it may also be said that the state monitoring ECU 40 functions as a position determination section at S180.

At S190, subsequently, correction control is carried out so that the brightness value of the face position area in the picture image PI generated at S130 in the next cycle is equal to a predetermined brightness value. Thus a picture image suitable for image processing can be acquired. In the correction control, computation is performed by postprocessing, such as adding the digital gain of the image pickup part 7. As mentioned above, it may also be said that the state monitoring ECU 40 functions as a brightness correcting section at S190. This correction by digital gain or the like should essentially be carried out before the processing of S140. However, since a correction value is computed based on the result of recognition processing, the correction is carried out with a frame delay. This delay hardly provides disadvantageous effects to the system carrying out image pickup continuously at a high speed (for example, 30 fps).

Figure 9:
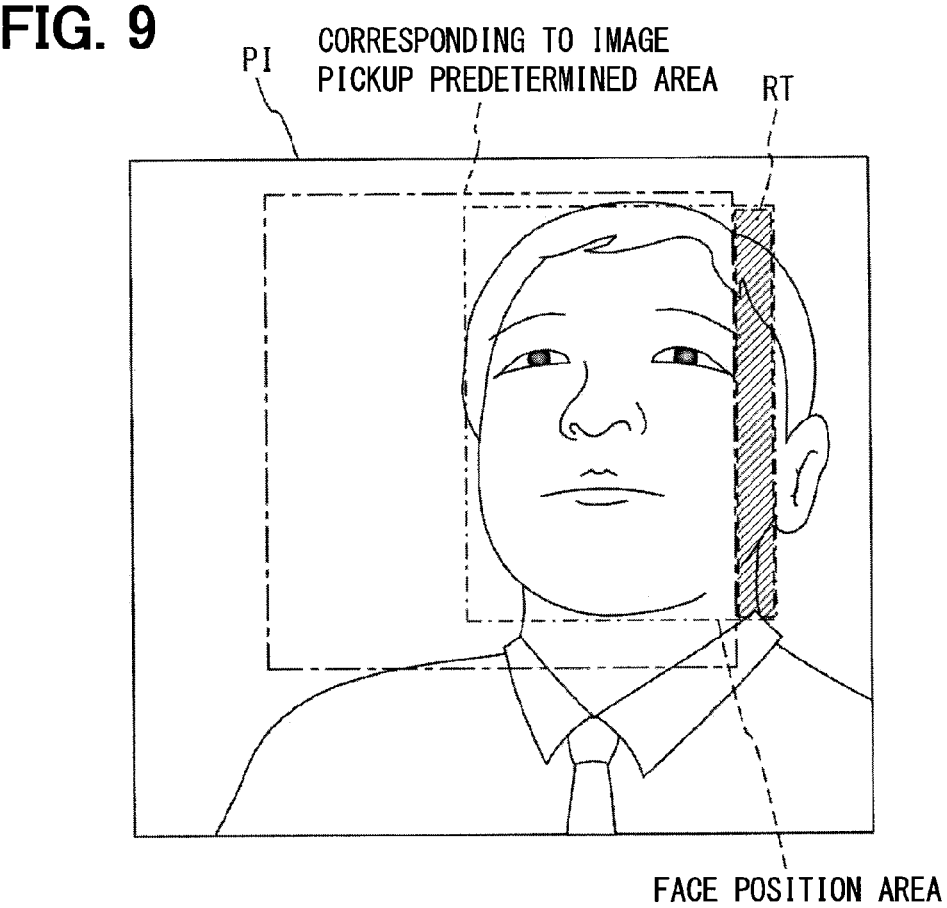
FIG. 9 is an explanatory drawing showing a criterion for starting the execution of correction control.

In the correction control in this embodiment, as illustrated in FIG. 9, a digital gain is computed and the picked-up picture image is processed. This is done so that the following brightness value will be equal to the predetermined brightness value in the next time of image pickup: the brightness value of every pixel constituting an area RT outside the areas on the image sensor corresponding to the image pickup predetermined area in the face position area obtained by image processing. The predetermined brightness value in this embodiment refers to such a brightness value that: the brightness value of every pixel constituting the face position area is equal to or higher than a brightness value corresponding to the intensity reference value and the distribution of the brightness values of the individual pixels is within the first reference range.

The correction control may be carried out so that it is converged stepwise in the process of repeating a series of cycle from S120 to S200 in FIG. 7. The reason why the correction control is carried out as mentioned above is as follows: in the actual vehicle environment, the optimum image pickup environment may significantly vary from image pickup frame to image pickup frame because of various factors; and if set values in a control table are changed in one go, such a phenomenon as hunting can occur.

Thereafter, the processing proceeds to S200.

When the result of the determination at S180 reveals that every pixel constituting the face position area is within area on the image sensor corresponding to the image pickup predetermined area (S180: YES), the processing of S190 is not performed and the processing proceeds to S200.

At S200 to which the processing proceeds as mentioned above, optimum values are derived with respect to at least either of the control values for the light emission parts 9 and the control values for the image pickup part 7. Examples of the control values derived at S200 are light exposure time, analog gain value added when a pixel value is outputted, the intensity of light emission, and the like. The derivation of control values at S200 can be carried out in accordance with a table correlating the state of a picture image PI determined beforehand by experiment or the like and optimum control values with each other.

Thereafter, the processing returns to S120 and the digital gain computed at S190 and the control values derived at S200 are set and the processing transitions to S120. As a result, the computed value of digital gain is added to the picture image newly picked up with the set control values to generate a picture image PI.

The processing of S120 to S200 is repeated until the ignition switch is turned off by the occupant Hm.

<1.6 Effect of First Embodiment>

When the image pickup system 5 is installed in the above-mentioned installation position, the constituent points in the projection plane that is a plane in the perpendicular direction and the horizontal direction are different in distance from the image pickup system 5.

Some of the constituent points in this projection plane are probably parts (eyes, nose, mouth, and the like) of the face of the occupant Hm present in the predetermined area PA and probably reflect the illumination light projected from the light emission parts 9. Usually, when the distance from the light emission parts 9 to a constituent point reflecting the illumination light is long, the light reflected at the constituent point is scattered and thereby attenuated before it is incident on the light receptive surface of the image sensor. For this reason, there is a possibility that a picture image generated in a conventional state monitoring apparatus is not a picture image PI suitable for the execution of state monitoring processing at the state monitoring ECU.

Contrarily, in the state monitoring apparatus 1 in this embodiment, the optical members 11 are so configured that more intense illumination light arrives at a constituent point farther away from the light emission parts 9. Further, the more concrete light distribution characteristics of the optical members 11 are designed to implement the following: the intensity of light incident on each pixel constituting the image pickup predetermined area is equal to or higher than the intensity reference value; and the distribution of the intensity of light incident on each pixel constituting the image pickup predetermined area is within the first reference range.

With this state monitoring apparatus 1, the intensity of light incident on each pixel constituting the image pickup predetermined area is equal to or higher than the intensity reference value, while the distribution of the intensity of light incident on each pixel constituting the image pickup predetermined area is uniform. This can generate a picture image PI suitable for the execution of state monitoring processing.

In addition, with the state monitoring apparatus 1, a picture image PI suitable for the execution of state monitoring processing can be generated with suppressed light emission to useless areas as compared with conventional state monitoring apparatuses. For this reason, the effect of illumination can be enhanced without increasing the number of light emitters. Therefore, unlike conventional state monitoring apparatuses, the state monitoring apparatus 1 makes it possible to suppress increase in the size of the entire state monitoring apparatus 1 as much as possible and suppress increase in the power consumed at light emitters as much as possible.

In other words, the state monitoring apparatus 1 makes it possible to project uniform illumination light having an intensity equal to or higher than the intensity reference value to the image pickup area as much as possible and suppress increase in the size of the entire apparatus as much as possible. Further, the state monitoring apparatus 1 makes it possible to suppress increase in the power consumed at floodlight projectors as much as possible.

The light distribution characteristics of the optical members 11 are so designed that the illumination light is more intense in an area closer to the center presence area and is weaker in an area farther away from the center presence area in the horizontal direction.

In a picture image PI generated under the light distribution characteristics, the shadows are more conspicuous; however, degradation in detection performance can be suppressed more than by forming an illumination distribution in any other axial direction. Therefore, the picture image PI matches the properties of head models used in face position identification processing.

As a result, with the state monitoring apparatus 1, a picture image PI suitable for state monitoring processing at the state monitoring ECU 40 can be generated without projecting illumination light more intense than necessary to the entire image pickup area.

Further, in the state monitoring apparatus 1, correction control is carried out so that the following is implemented: the brightness value of every pixel constituting an area RT outside the image pickup predetermined area in the face position area is equal to the predetermined brightness value in the next time of image pickup. With the state monitoring apparatus 1, a picture image PI most suitable for the execution of state monitoring processing can be generated with a high probability by this correction control.

Further, in the state monitoring apparatus 1, the optical member 13 is provided with the light shielding portion 15. For this reason, in the state monitoring apparatus 1, the illumination light emitted by the light emission parts 9 is prevented from being incident on the image pickup part 7 more than necessary and a picture image PI most suitable for the execution of state monitoring processing can be generated with a high probability.

According to the foregoing, the state monitoring apparatus 1 makes it possible to enhance the accuracy of monitoring the state of an occupant Hm.

<1.7 Modification to First Embodiment>

Up to this point, the description has been given to the first embodiment. The present disclosure is not limited to the above embodiment and can be variously embodied without departing from the subject matter of the present disclosure.

Some examples will be taken. In the above embodiment, each light emission part 9 in the image pickup system 5 is formed of LED. However, the light emission parts 9 are not limited to this and anything is acceptable as long as it is a light emitter emitting illumination light.

Figure 10:
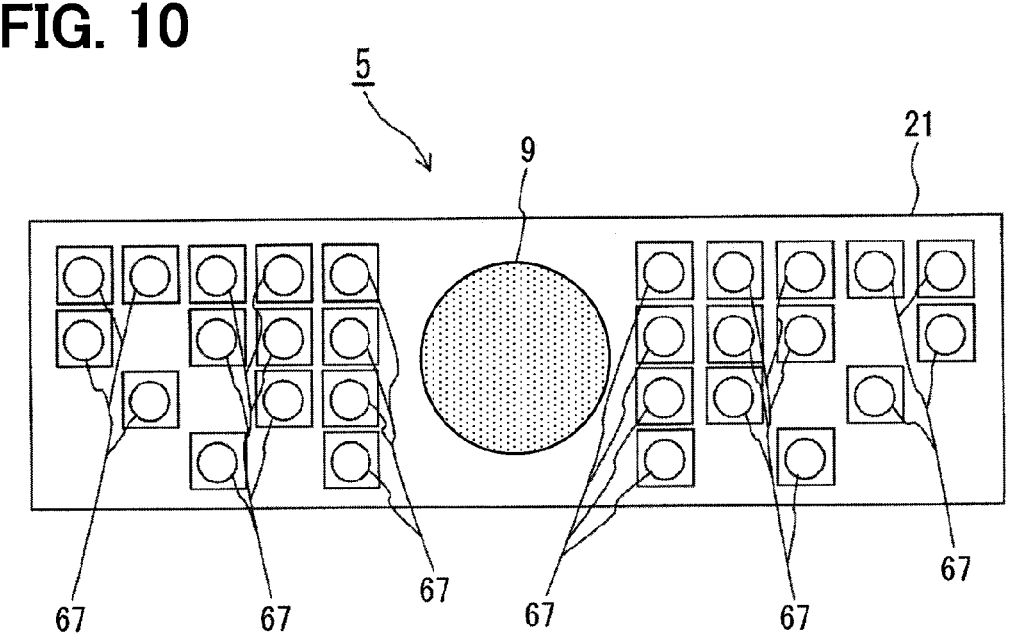
FIG. 10 is an explanatory drawing illustrating a modification with respect to the arrangement of floodlight projectors.

In the above embodiment, the number of the light emission parts 9 is two; however, the number of the light emission parts 9 is not limited to this. Specifically, as illustrated in FIG. 10, there may be three or more light emission parts 67 (also referred to as floodlight projectors 67) arranged more densely in the perpendicular direction than in the horizontal direction. In this case, it is desirable that each of the light emission parts 67 should be an apparatus that emits light having high rectilinearity as illumination light.

Even with this structure of the light emission parts 9, picture images PI in which the following is implemented and which is suitable for the execution of state monitoring processing can be generated: the intensity of light incident on each pixel constituting the image pickup predetermined area is equal to or higher than the intensity reference value; and the distribution of the intensity of light incident on each pixel constituting the image pickup predetermined area is within the first reference range. In this case, the plurality of light emission parts (floodlight projectors) 67 function as an optical control part or an optical control device.

Further, when each of the light emission parts 67 is formed of a light emitter that emits light having rectilinearity as illumination light, the state monitoring apparatus may be provided with an optical member. This optical member collects illumination light emitted by the light emission parts 67 or light emitters and distributes the light to the predetermined area PA.

At S190 in the above embodiment, correction control is carried out. When all the pixels constituting the face position area are not in an area corresponding to the image pickup predetermined area, this correction control is carried out as follows: the digital gain of the image pickup part 7 is adjusted so that the brightness value of the face position area in the picture image PI generated in the next cycle is equal to the predetermined brightness value. However, the details of correction control are not limited to this. For example, correction control may be carried out regardless of whether or not the face position area is in an area corresponding to the image pickup predetermined area. In this case, correction control may be carried out by adjusting the digital gain so that the following is implemented: the brightness value of each pixel corresponding to the face position area is equal to or higher than a brightness value corresponding to the intensity reference value; and the distribution of the brightness values of the individual pixels is within the first reference range.

Correction control may be carried out when a picture image PI is picked up or may be carried out by correcting the brightness value of a picture image PI after the picture image PI is picked up.

In the above embodiment, the following measure is taken with respect to the relation between the timing with which the light emission parts 9 emit illumination light and the timing with which the image pickup part 7 picks up a picture image PI: the period for which the light emission parts 9 emit illumination light is made longer than the light exposure period of the image pickup part 7; and further pickup (from start of light exposure to end of light exposure) of a picture image PI by the image pickup part 7 is carried out during periods for which the light emission parts 9 emit illumination light. The relation between the timing of emitting illumination light and the timing of picking up a picture image PI is not limited to this. That is, the light exposure period of the image pickup part 7 may be longer than each period for which the light emission parts 9 emit illumination light.

Further, the state monitoring ECU 40 may carry out control so that the light emission parts 9 constantly emit illumination light.

Figure 11:
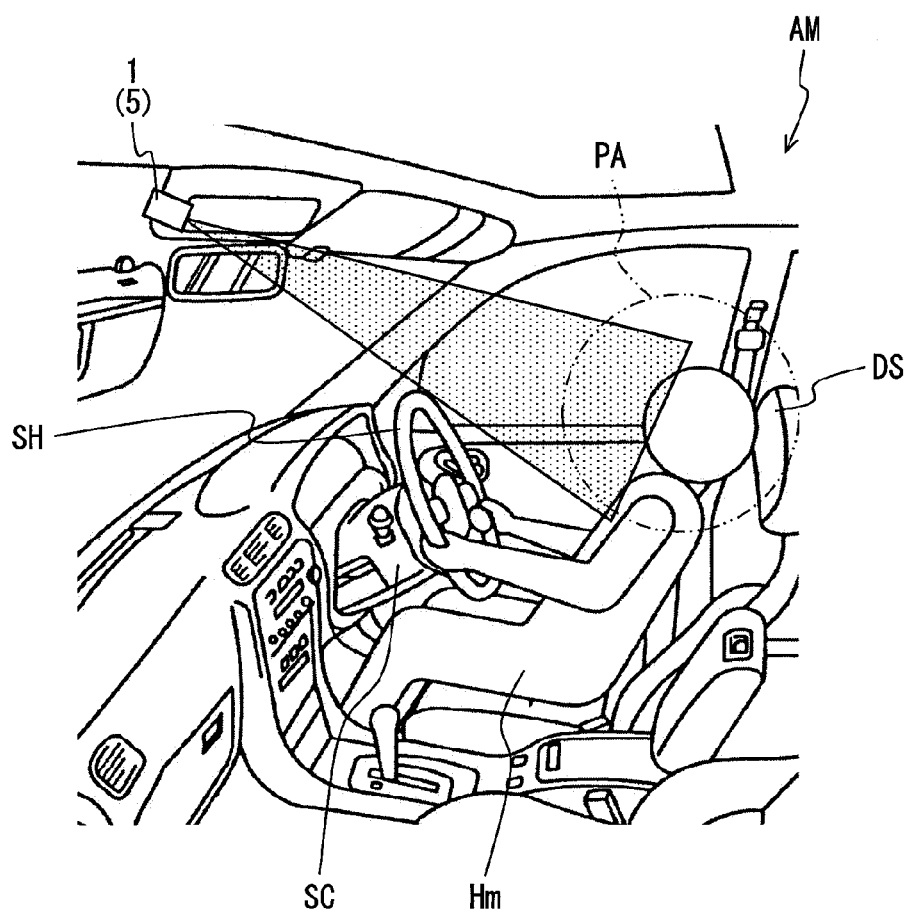
FIG. 11 is a drawing illustrating a modification of the installation position of a state monitoring apparatus.

In the above embodiment, the installation position is the outer surface of the upper part of the steering column SC to which the steering wheel SH is connected; however, the installation position is not limited to this. For example, the installation position may be the vicinity of the inner rear view mirror in the vehicle compartment as illustrated in FIG. 11 or may be on the dashboard, on the surface of a meter, inside a meter, or the like.

The state monitoring apparatus 1 in the above embodiment is provided with the optical member 13 but it need not be provided with the optical member 13.

In the above embodiment, the condition for starting state monitoring processing is turn-on of the ignition switch; however, the condition for starting state monitoring processing is not limited to this. For example, state monitoring processing may be started when the host vehicle AM is unlocked or when a dedicated switch is turned on.

In the above embodiment, the object in which the state monitoring apparatus 1 is installed is an automobile; however, the object in which the state monitoring apparatus 1 is installed is not limited to an automobile. The state monitoring apparatus 1 may be installed on a bicycle or in rolling stock. That is, the state monitoring apparatus 1 may be installed in anything as long as it is a vehicle.

<1.8 Aspect of Disclosure of First Embodiment>

The following is a description of an aspect of the disclosure of the first embodiment. As an aspect of the disclosure, in a state monitoring apparatus, at least one light emission device projects illumination light containing at least a near infrared wavelength to a predetermined area. The predetermined area is defined beforehand from eyellipse or the like as an area where the face of an occupant is positioned in the space in the compartment of the host vehicle in terms of design. An area in the vehicle compartment including the predetermined area is taken as an image pickup area; and an image pickup device forms an image from the light incident from the image pickup area by an image sensor having a plurality of pixels and thereby generates a picture image. Based on the result of processing the picture image generated at the image pickup device, a state monitoring device detects and estimates the state of an occupant of the host vehicle and carries out actuation according to the state.

Further, in the state monitoring apparatus according to this aspect, the following processing is carried out: an area on the image sensor which is at least a part of the light receptive surface of the image sensor of the image pickup device and corresponds to the predetermined area is taken as an image pickup predetermined area; an optical control device controls light distribution. The light distribution is controlled so that the following is implemented: the intensity of light incident on each pixel constituting the image pickup predetermined area is equal to or higher than an intensity reference value predetermined as the intensity of light with which a picture image suitable for image processing at the state monitoring device is obtained; and the distribution of the intensity of light incident on each pixel constituting the image pickup predetermined area is within a predetermined first reference range. The distribution cited here includes at least controlled variation.

With the state monitoring apparatus according to this aspect, the following can be implemented without increasing the number of light emission devices in conventional state monitoring apparatuses: the intensity of light incident on each pixel constituting the image pickup predetermined area is equal to or higher than the intensity reference value; and the distribution of the intensity of light incident on each pixel constituting the image pickup predetermined area is within the first reference range.

As a result, the state monitoring apparatus according to this aspect makes it possible to implement the following as compared with conventional state monitoring apparatuses: increase in the size of the entire state monitoring apparatus is suppressed as much as possible and increase in the power consumed at the light emission devices is suppressed as much as possible.

In other words, the state monitoring apparatus according to this aspect makes it possible to: project illumination light having an intensity equal to or higher than the intensity reference value and minimum necessary uniformity to the image pickup area as much as possible and suppress increase in the size of the entire apparatus as much as possible; and suppress increase in the power consumed at the floodlight projectors as much as possible.

Each part (eyes, nose, mouth, and the like) of the face of an occupant present in the predetermined area is probably located in a position irradiated with illumination light projected from a light emission device. When this illumination light is projected to the face, the light is reflected from the face. When the distance from the light source in the light emission device to the point at which the light is reflected is long, the following takes place: when the illumination light is scattered light that is not coherent, the light reflected at the point is scattered and thereby attenuated until it is incident on the light receptive surface of an image sensor.

In consideration of the intensity of this attenuated light, the optical control device according to this aspect may control light distribution so that the following is implemented with respect to each part of the face of an occupant that is probably present in the predetermined area: more intense illumination light arrives at a point farther away from the light source in the light emission device.

Usually, light is attenuated inversely with the square of the distance. Therefore, it is advisable that the optical control device according to this aspect should be designed with the distribution of intensity corresponding to the distance taken into account so that the following is implemented: light is distributed so that predetermined light arrives at the image pickup predetermined area.

The attenuation of light is influenced by not only distance but also the amount of ambient light of an image pickup system lens. Specifically, when light identical in brightness from an identical distance is incident on an image sensor from different angles, the intensity of light arriving at the center of the image sensor is higher than the intensity of light arriving at the peripheral area. For this reason, the optical control device according to this aspect may distribute light so that it is intensified according to distance from the optical center with the light amount ratio taken into account (the light distribution may be corrected). Light may be significantly attenuated by the influence of surface reflection depending on the angle of incidence on the image pickup lens. Therefore, with respect to the optical control device according to this aspect, it is effective to carry out control so that the light distribution characteristics with the foregoing taken into account are obtained.

With this optical control device, the following can be implemented with respect to picture images processed at the state monitoring device: the intensity of light incident on each pixel constituting the image pickup predetermined area is equal to or higher than the intensity reference value; and the distribution of the intensity of light incident on each pixel constituting the image pickup predetermined area is within the first reference range.

However, the picture image described above is a picture image acquired when a virtual plane (projection plane in the embodiment) is assumed as the predetermined area. In this picture image, the following takes place when an occupant is present in the predetermined area: body parts, such as, for example, eyebrows, low in reflection coefficient and body parts, such as noseholes, that are shadowed with respect to the optical axis of projected light are locally darkened. This leads to a highly contrasty picture image. This picture image is more suitable for image processing.

In this aspect, the following measure may be taken: an area in the predetermined area where the center of the face of an occupant is probably positioned is taken as a center presence area; and an area in the light receptive surface corresponding to the center presence area is taken as an image pickup predetermined area.

In this case, it is desirable that the center presence area according to this aspect should be the following area: an area embracing an area where the entire face is not out of the image pickup predetermined area when the eyes are preset in an ellipse defined as different eyellipses depending on the type of the vehicle. To determine the size of a face relative to the eye position, A2: Head breadth, A15: Morphologic face height, and A36: Total head height of "Anthropometrical Database (http://riodb.ibase.aist.go.jp/dhbodydb/91-92/)" released from AIST and the like can be referred to.

Further, the optical control device according to this aspect may control light distribution so that with respect to the center presence area, the distribution of the intensity of illumination light in the perpendicular direction is within the following second reference range: a second reference range predetermined as a range in which the distribution can be considered as uniform in the perpendicular direction as compared with in the other directions.

This optical control device makes it possible to make uniform the distribution of brightness values in the pixels along the vertical direction among the pixels corresponding to the center presence area as compared with those along the other directions than vertical. The vertical direction cited here refers to a direction including a direction perpendicular to the horizontal plane and further including a predetermined range of angle from a vertical axis to the horizontal plane.

In such a state monitoring apparatus, as image processing by the state monitoring device, usually, the following detection is carried out: the detection of the face direction of an occupant; the detection of the drowsiness of an occupant; the detection of the line of sight of an occupant; and the like. To carry out any of these detection methods, it is required to detect the face of the occupant and at least one of the facial parts (eyes, nose, mouth, and the like).

Figure 12:
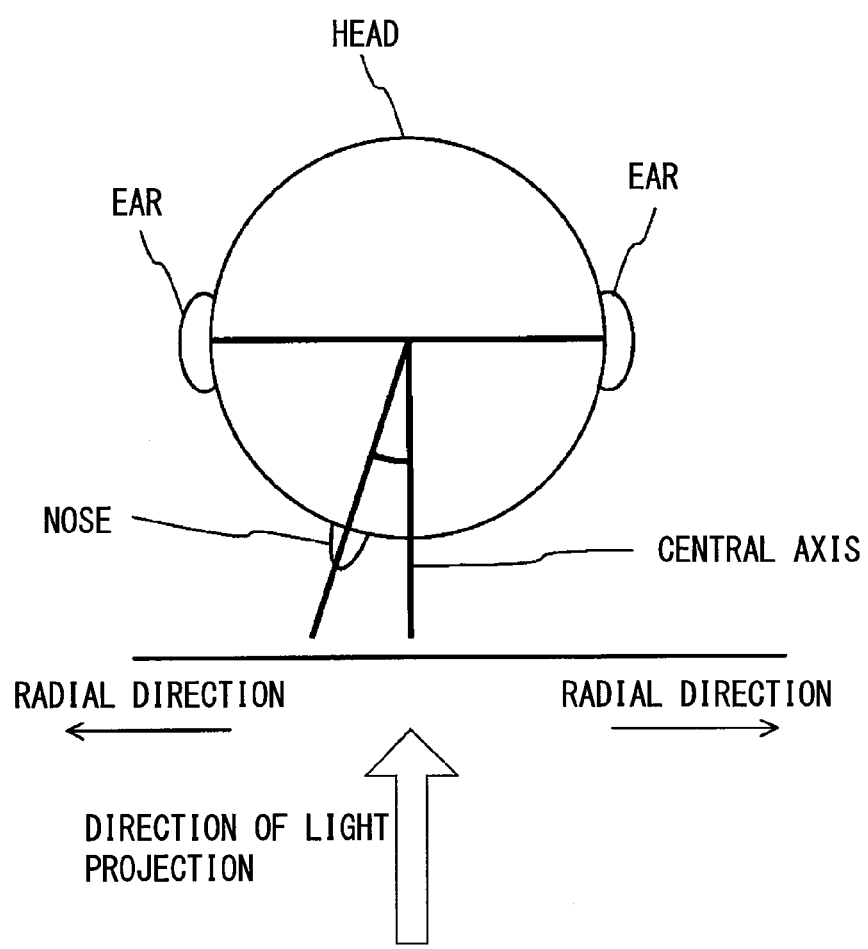
FIG. 12 is an explanatory drawing showing a head model.

In processing to detect the face direction of an occupant, usually, a head model simulating a human head is used. The head model may be a three-dimensional model taken as a standard face using the above-mentioned anthropometrical database or the like or may be represented as a simple cylindrical model as shown in FIG. 12. A cylindrical model irradiated with light usually has the properties that it is brighter as it goes closer to the central axis and is darker as it goes farther away from the central axis in the radial direction. Thus the cylindrical model is clear in contrast; this is taken into account by detection algorithms (or preprocessing).

In consideration of these properties, the optical control device according to this aspect may control light distribution so that the following is implemented: the illumination light is more intense in an area closer to the center presence area and is weaker in an area farther away from the center presence area in the horizontal direction. This makes the contrast more conspicuous but it makes it possible to suppress degradation in the detection performance more than by forming an illumination distribution in any other axial direction.

The light distribution accomplished by this optical control device matches the properties of head models. As a result, it is possible to generate a picture image suitable for image processing at the state monitoring device without projecting illumination light more intense than necessary to the entire image pickup area. The horizontal direction cited here includes a direction parallel to a horizontal plane and further includes a direction within a predetermined range of angle from a horizontal axis with respect to the horizontal plane.

2 Second Embodiment

<2.1 State Monitoring Apparatus>

The configuration of the state monitoring apparatus in a second embodiment is identical with that described in <1.1 State monitoring Apparatus> in the first embodiment with reference to FIGS. 1, 2, 3, 4, 5, and 13 except the following point. A description of the identical point will be omitted. Unlike the first embodiment, the second embodiment does not require the configuration of the attenuating portion 19, illustrated in FIG. 4, having a function of attenuating illumination light unintentionally propagated in the optical member 13.

Figure 14:
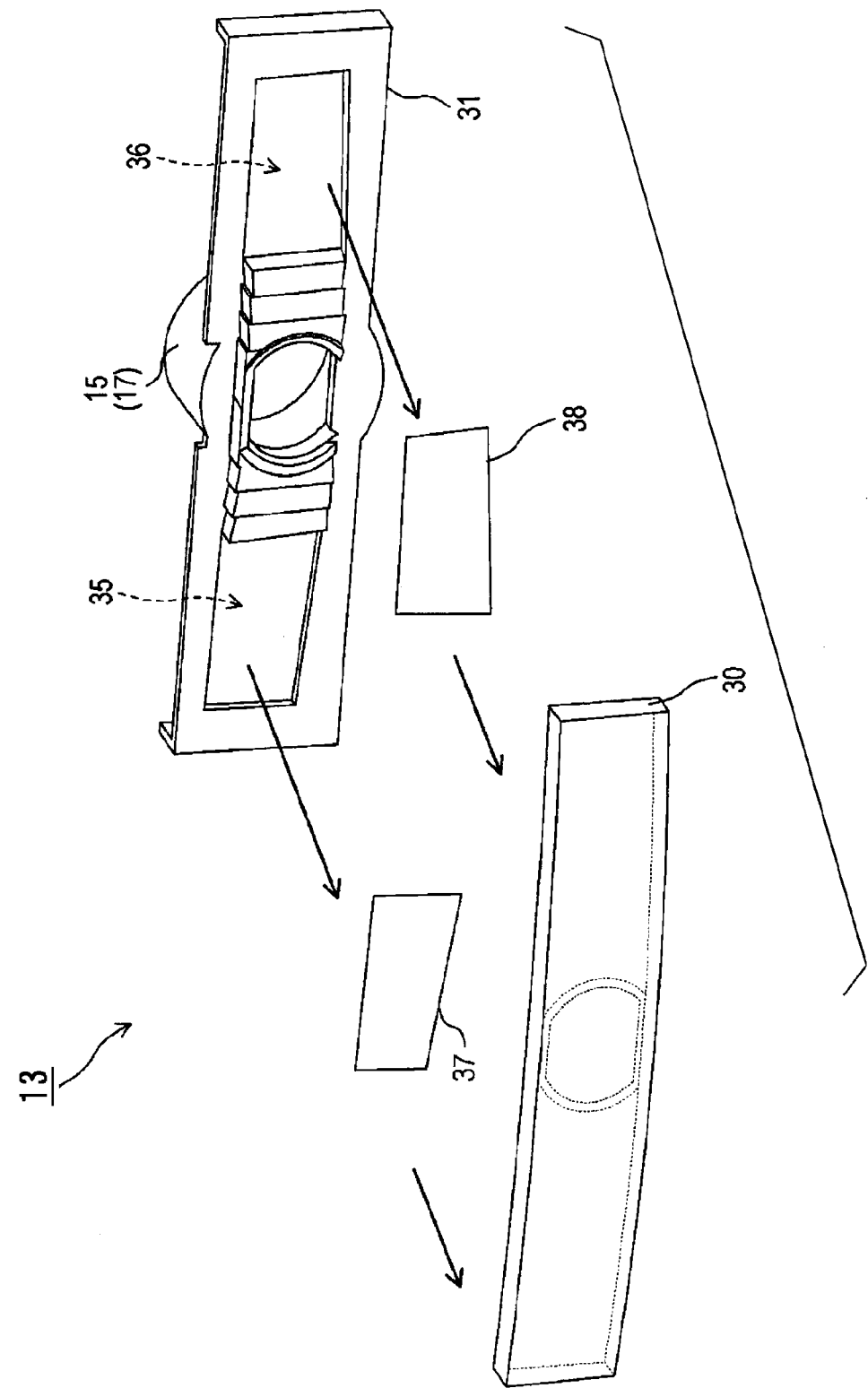
FIG. 14 is a drawing illustrating the structure of an optical member.

As illustrated in FIG. 14, meanwhile, the optical part 13 is provided with diffuser panels 37, 38 (also referred to as diffuser parts or diffuser devices) between the visible light cut filter 30 and the shade 31. Each of the diffuser panels 37, 38 is a lens diffuser panel so shaped that it covers each opening 35, 36 in the shade 31. Each of the diffuser panels 37, 38 is a filter that diffuses illumination light passing through each opening 35, 36 to a predetermined range of angle (for example, from 5 degrees to 20 degrees). For the purpose of achieving the diffusion of illumination light to the predetermined range of angle, in the diffuser panels 37, 38, a micro lens array having projections and depressions in the surface of a substrate formed in the shape of, for example, sheet is formed.

<2.2 Light Distribution by Optical Member>

The configuration of light distribution by the optical member in the second embodiment is identical with that described in <1.2 Light Distribution by Optical Member> in the first embodiment with reference to FIG. 5; therefore, the description thereof will be omitted.

<2.3 Configuration of Optical Member>

Figure 15:
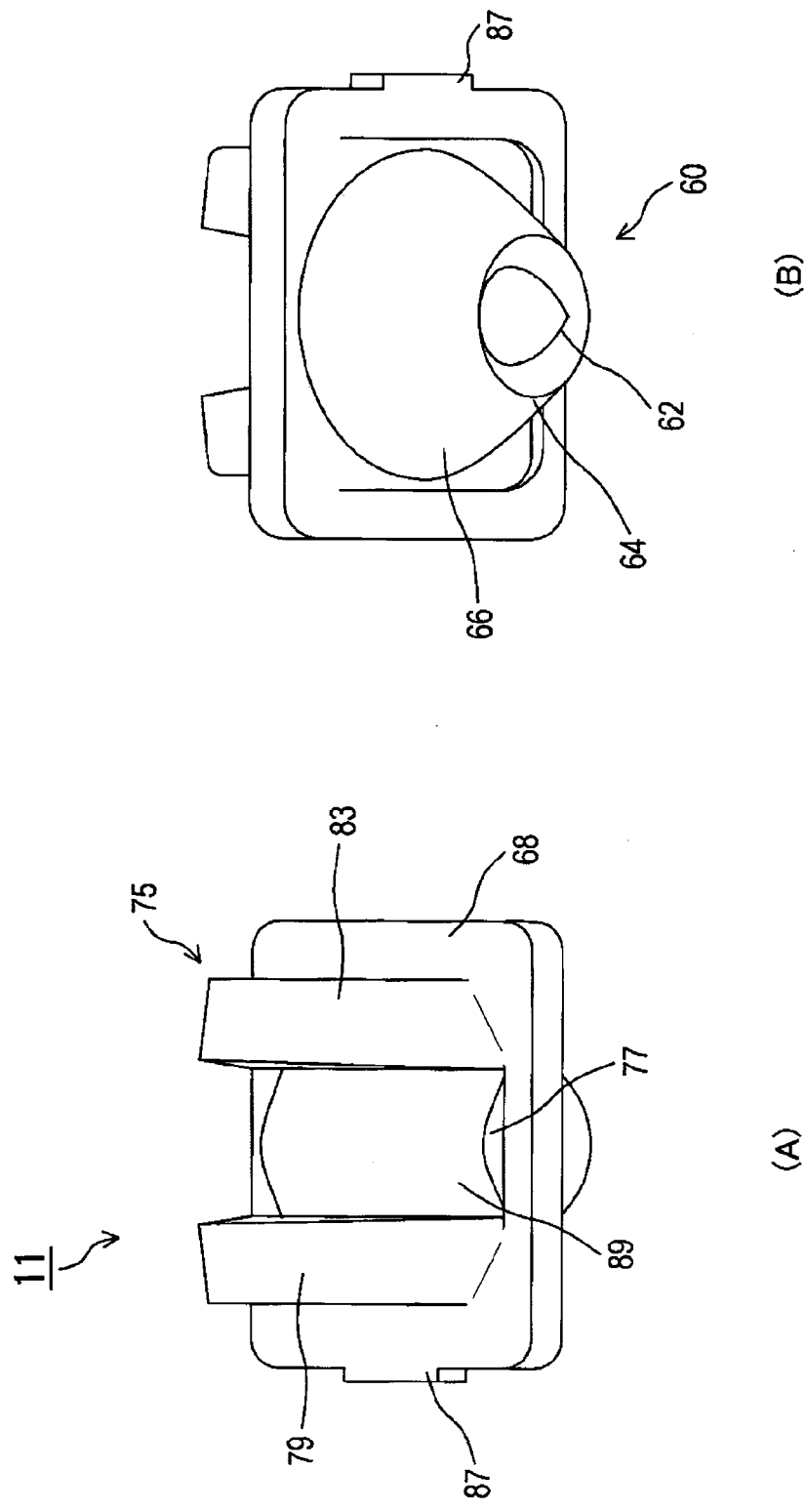
FIG. 15 is a perspective view of the appearance of an optical member.
Figure 16:
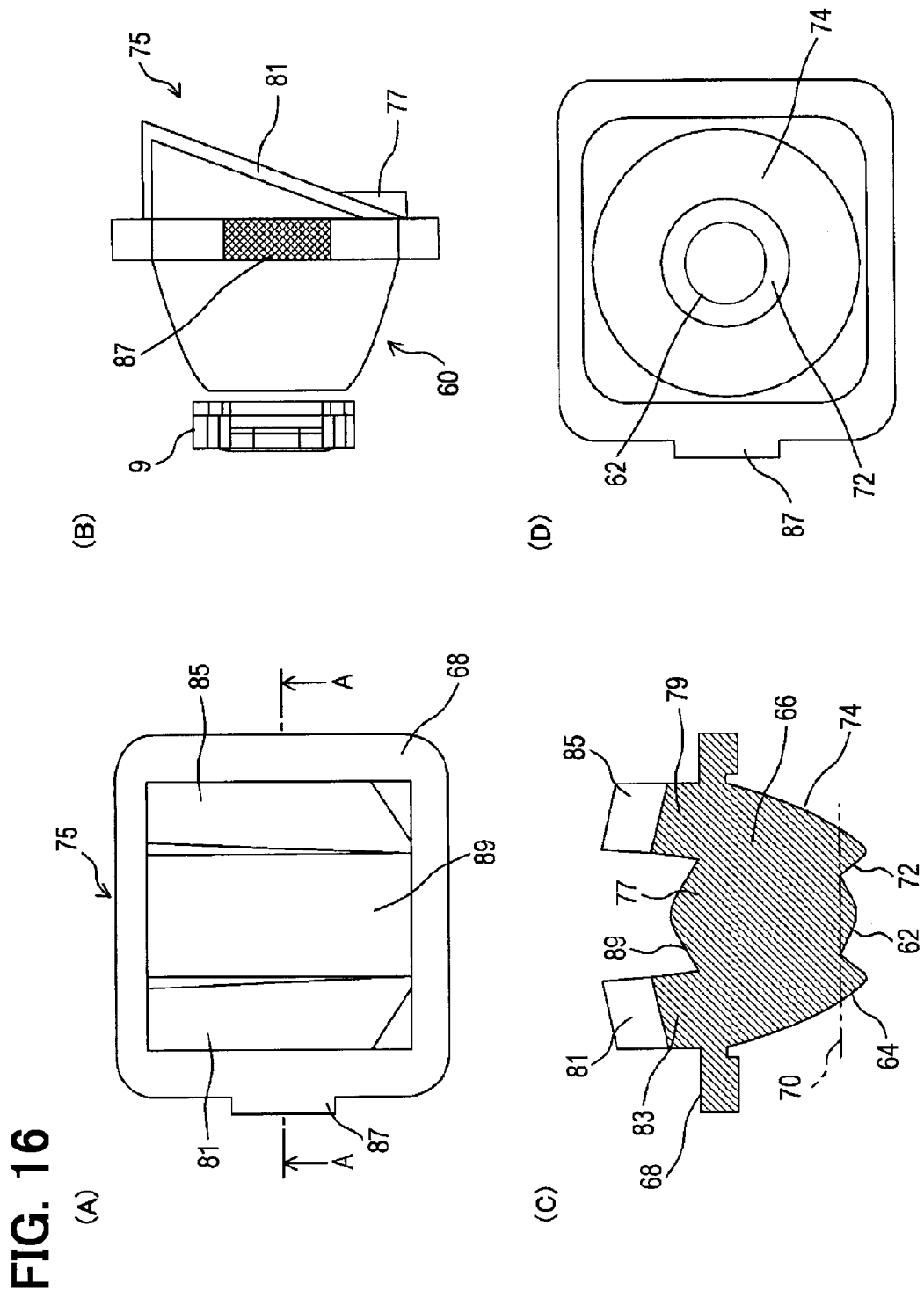
FIG. 16 is a drawing illustrating the structure of an optical member.

To achieve the above-mentioned light distribution, the optical members 11 in the second embodiment are characterized in the configuration thereof added to the first embodiment. Hereafter, a description will be given to the characteristic of the optical members. As illustrated in FIG. 15 and FIG. 16, each optical member includes: an incident part 60 on which illumination light from each light emission part 9 is incident; and a projecting part 75 that distributes illumination light collected at the incident part 60 to the predetermined area PA. Each optical member 11 is a lens obtained by connecting and integrally molding the incident part 60 and the projecting part 75 at a plane (hereafter, referred to as connecting face) 68 through which illumination light passes. The connecting face 68 is provided with an engaging part 87 that is a plate-like part protruded from the connecting face 68 and engaged with the rim of a fitting hole 27 formed in the part 23.

Each optical member 11 is formed of a material, for example, glass or resin, letting illumination light through. When the optical members are formed of a resin material, it is desirable that the following material enduring high temperatures should be used because they are installed in proximity to the light emission parts 9: a material, such as COC (Cyclic Olefin Copolymer), COP (Cyclic Olefin Polymer), PC (PolyCarbonate) having a high glass transition temperature and high optical properties (high transparency, low birefringence).

FIG. 15(A) is a perspective view of the optical member 11 as obliquely viewed from the projecting part 75 and FIG. 15(B) is a perspective view of the optical member 11 as obliquely viewed from the incident part 60. FIG. 16(A) is a front view of the optical member 11 as viewed from the projecting part 75 and FIG. 16(B) is a side view of the optical member 11. FIG. 16(C) is a sectional view taken along line A-A of FIG. 16(A) and FIG. 16(D) is a front view of the optical member 11 as viewed from the incident part 60.

The incident part 60 includes a salient part 62, a guiding part 64, and a reflecting part 66.

The reflecting part 66 is formed in the shape of cylindrical column whose diameter is widened from an extended plane 70 to the connecting face 68. The extended plane 70 is a plane virtually defined in the incident part 60 and a plane included in the reflecting part 66 on which the salient part 62 and the guiding part 64 are provided. In this embodiment, the section taken along the alternate long and short dashed line drawn in FIG. 16(C) is equivalent to the extended plane 70.

The salient part 62 is formed in the shape of cone and provided so that it is protruded from the central part of the reflecting part 66 in the extended plane 70. The cone representing the shape of the salient part 62 in this embodiment is, for example, a circular cone. The side face of the salient part 62 may be a curved surface continuously varying from the top of the salient part 62 to the extended plane 70. The curved surface cited here includes a non-spherical surface.

The opening diameter of the salient part 62 is adjusted so that the following light distribution is formed: such a light distribution that the ratio of the amount of light going upward in the projection plane in the perpendicular direction to the amount of light projected to the entire projection plane is uniform in the perpendicular direction.

The guiding part 64 is formed in the shape of ring encircling the salient part 62 in the circumferential direction and is provided so that it is protruded from the extended plane 70 of the reflecting part 66. The top of the guiding part 64 is provided so that it is higher than the top of the salient part 62.

The sectional shape of the portion of the guiding part 64 protruded from the extended plane 70 is, for example, a triangular shape or any other shape. The triangular shape includes a substantially triangular shape whose top part is chamfered.

The outer circumferential surface of the guiding part 64 is provided so that it agrees with the circumference of the reflecting part 66 in the extended plane 70 and is provided so that the diameter thereof is widened from the top of the guiding part 64 to the extended plane 70.

Hereafter, the side face of the incident part 60 formed by the outer circumferential surface of the guiding part 64 and the outer circumferential surface of the reflecting part 66 will be referred to as light collecting outer circumferential surface 74.

The light collecting outer circumferential surface 74 is formed in the shape of curved surface continuously varying from the connecting face 68 to the top of the guiding part 64. The curved surface of the light collecting outer circumferential surface 74 has a curvature including such a critical angle that the illumination light incident from the inner circumferential surface (which can also be referred to as transmitting plane) 72 of the guiding part 64 is totally reflected to the connecting face 68.

The inner circumferential surface 72 of the guiding part 64 may be formed in a shape equivalent to the side face of a cylinder or may be formed in such a shape that a light beam refracted at the inner circumferential surface is efficiently guided to the projecting surface by the reflecting part 66.

The salient part 62 may be configured so that the amount of incident light is, for example, 1.0 to 3.0 times that of the guiding part 64.

The projecting part 75 projects the illumination light collected at each incident part 60 from the projecting surface and distributes the light. The projecting part 75 in this embodiment includes a cylindrical portion 77 and prism portions 79, 83.

The cylindrical portion 77 is a publicly known cylindrical lens connected to the central part of the connecting face 68 so that the cylindrical surface 89 thereof is at least a part of the projecting surface. The cylindrical portion 77 (cylindrical lens) is connected to the connecting face 68 so that the axis of the cylindrical lens in the axial direction agrees with the axis of the host vehicle in the perpendicular direction.

The cylindrical surface 89 in this embodiment is a non-spherical surface. The shaving amount z to obtain this non-spherical shape is expressed by the following publicly known formulas (1) and (2):

[EXPRESSION 1]

$$Z = \frac{cr^2}{1+\sqrt{1-(1+k)c^2r^2}} + \sum_{n=2}^{10} C_{2n} r^{2n} \quad (1)$$

$$r^2 = x^2 + y^2 \quad (2)$$

where, c in Formula (1) is the reciprocal of a reference curvature radius; k is a constant of the cone; and $C_{2n}$ is an aspherical coefficient. Further, r is the distance from the center of the lens to the relevant point.

However, the cylindrical surface 89 need not be non-spherical and may be spherical. The curvature of the cylindrical surface 89 can be appropriately determined according to the positional relation between the installation position of the image pickup system 5 and the center presence area so that the following is implemented: the projected light passing through the cylindrical surface 89 is refracted and projected to the predetermined area PA.

The shaving amount z to obtain the curvature of the side face of the salient part 62 and the curvature of the curved surface of the light collecting outer circumferential surface 74 may be determined based on Formulas (1) and (2). When the cylindrical surface 89 and the side face of the salient part 62 are determined based on Formulas (1) and (2) as mentioned above, the respective curvatures and aspherical coefficient $C_{2n}$ can be determined based on the aspect ratio of the projection plane. In case of the cylindrical surface 89, specifically, the curvature is set to a small value when the aspect ratio of the projection plane is high. This makes it possible to give shading in the horizontal (left and right) direction.

Each of the prism portions 79, 83 is a prism formed in the shape of triangular pole. The prism portions 79, 83 (prisms) are connected to the connecting face 68 with one sides thereof abutted against the cylindrical lens portion 77 so that the cylindrical lens portion 77 is sandwiched between the prism portions 79, 83.

Each of the prism portions 79, 83 (prisms) is placed on the connecting face 68 so that one of a plurality of sides of each prism becomes an inclined plane 81, 85 inclined along the perpendicular direction of the host vehicle AM. The inclination of the inclined planes 81, 85 along the perpendicular direction is provided so that the following is implemented: the height from the connecting face 68 is increased as it goes closer to the headlining board of the host vehicle AM; and the height from the connecting face 68 is reduced as it goes farther away from the headlining board of the host vehicle AM.

When the elevation angle is 20° to 30°, it is desirable that the inclination of each inclined plane 81, 85 in the perpendicular direction should be designed to, for example, 10° to 50°.

Each of the inclined planes 81, 85 has an inclination along the horizontal direction of the host vehicle. This inclination along the horizontal direction is formed so that the following is implemented: the height from the connecting face 68 is reduced as it goes farther away from the cylindrical portion 77; and the height from the connecting face 68 is increased as it goes closer to the cylindrical portion 77.

The angle of inclination of each of the inclined planes 81, 85 can be determined according to the positional relation between the installation position of the image pickup system 5 and the center presence area so that the following is implemented: the projected light passing through the inclined planes 81, 85 is refracted and projected to the predetermined area PA.

Specifically, the positional relation between the installation position of the image pickup system 5 and the center presence area may be defined by using the following distances: the distance to the upper part of the area (that is, center presence area) in the projection plane calling for uniformity with respect to the projection center at the angle (elevation angle) formed by the reference axis of the image pickup system 5 and the horizontal axis; and the distance from each optical member 11 to the projection plane.

That is, the above-mentioned light distribution characteristics are achieved by appropriately varying the following items: each coefficient in Formula (1); the angle of inclination of the inclined planes 81, 85; the opening diameter of the salient part 62; and the lens diameter and lens surface dimensions of each optical member 11 itself.

Figure 17:
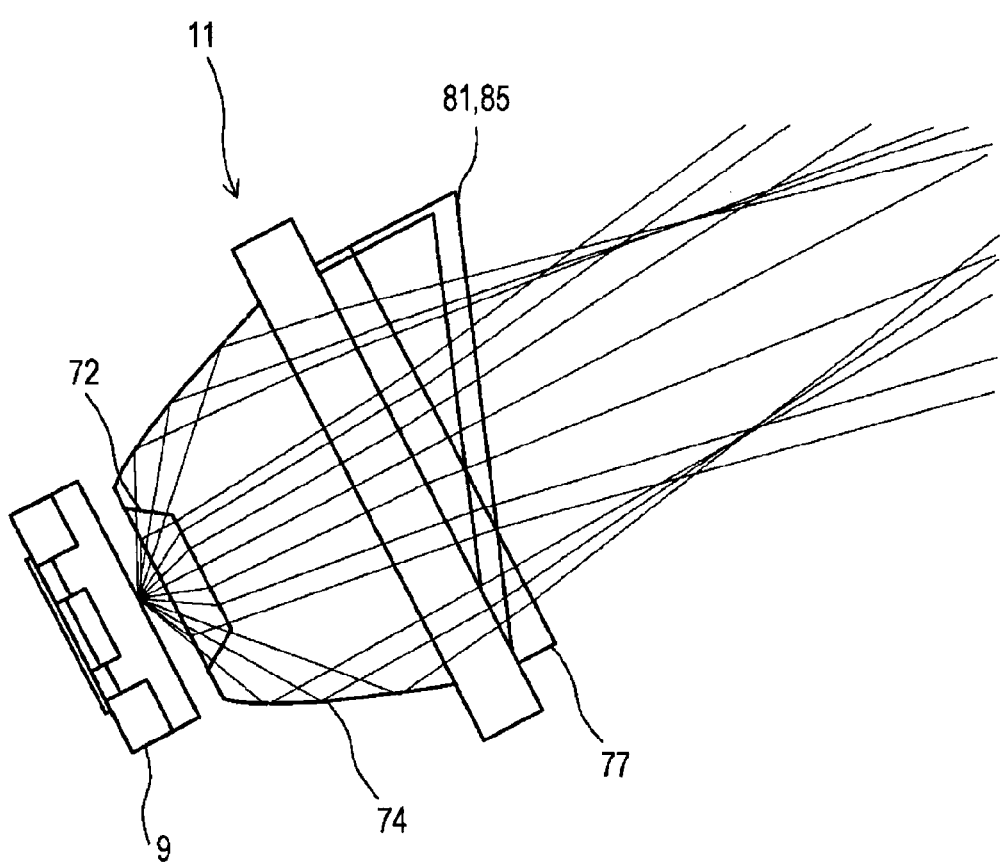
FIG. 17 is an explanatory drawing showing how light is distributed by an optical member.
Figure 18:
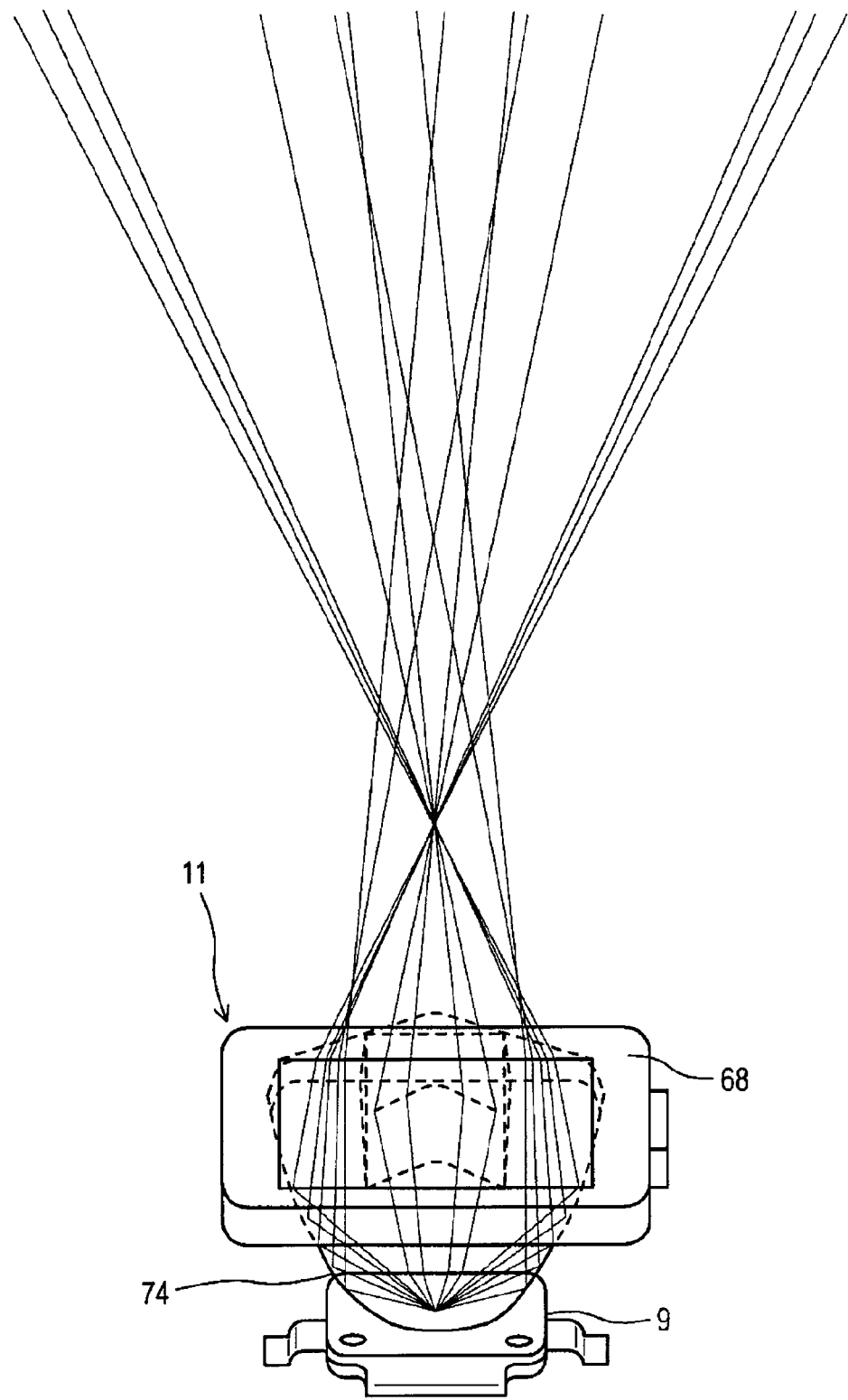
FIG. 18 is an explanatory drawing showing how light is distributed by an optical member.

In each optical member 11 formed as mentioned above, the following takes place as shown in FIG. 17 and FIG. 18: of the illumination light emitted at each light emission part 9, the illumination light incident from the salient part 62 of each incident part 60 is guided to the cylindrical portion 77 of the projecting part 75 by way of the connecting face 68. The illumination light guided to the cylindrical portion 77 is refracted when passing through the cylindrical surface 89 and is projected to the center presence area of the predetermined area PA.

Of the illumination light emitted at each light emission part 9, the illumination light incident from the inner circumferential surface 72 of each guiding part 64 is reflected at the outer circumferential surface of each reflecting part 66 or the outer circumferential surface of each guiding part 64. The light is then guided to each projecting part 75 by way of each connecting face 68. Of the illumination light passed through the inner circumferential surface 72 of each guiding part 64 and guided to each projecting part 75, the illumination light guided to each cylindrical portion 77 passes through each cylindrical surface 89. At this time, the illumination light is refracted so that the illumination light is concentrated on the center presence area of the predetermined area PA and the projected illumination light is reduced more in an area farther away from the center presence area.

Meanwhile, the illumination light guided to the prism portions 79, 83 is refracted in accordance with the inclination along the horizontal direction of the inclined planes 81, 85 so that the following is implemented: the illumination light is concentrated on the center presence area of the predetermined area PA and the projected illumination light is reduced more in an area farther away from the center presence area. Further, the illumination light guided to the prism portions 79, 83 is refracted in accordance with the inclination along the perpendicular direction of the inclined planes 81, 85 so that the intensity thereof is uniform along the perpendicular direction of the predetermined area PA.

As described up to this point, the following takes place with respect to the illumination light distributed to the predetermined area PA: the intensity of the illumination light arriving at the projection plane is equal to or higher than the reference value; and more intense illumination light arrives at a constituent point farther away from the light emission parts 9. Further, the following takes place with respect to light distribution to the predetermined area PA: the distribution of the intensity of light incident on constituent points along the perpendicular direction of the center presence area is within the second reference range; and the intensity of illumination light is reduced more in an area farther away from the center presence area in the horizontal direction.

Meanwhile, the image pickup part 7 of the image pickup system 5 forms an image from light incident on the image sensor through the optical lens to generate a picture image PI. Since the image pickup system 5 in this embodiment takes the predetermined area PA as the image pickup area, each picture image PI generated by the image pickup part 7 usually embraces the head (face) of an occupant Hm of the host vehicle AM.

In the image pickup system 5, furthermore, illumination light is distributed as mentioned above; therefore, the following is implemented: the intensity of light incident on each pixel constituting the image pickup predetermined area is equal to or higher than the intensity reference value; and the distribution of the intensity of light incident on each pixel constituting the image pickup predetermined area is within the first reference range.

<2.4 State Monitoring ECU>

The configuration of the state monitoring ECU in the second embodiment is identical with that described in <1.4 State monitoring ECU> in the first embodiment with reference to FIGS. 2 and 6; therefore, a description thereof will be omitted.

<2.5 Varied Processing>

Image processing in this embodiment includes: publicly known processing (hereafter, referred to as face position identification processing) for identifying the position of the head of the occupant Hm in a picture image PI; publicly known processing for deriving the degree of opening of the eyes of an occupant Hm; and publicly known processing for detecting the direction of the line of sight of an occupant Hm.

In the face position identification processing, publicly known processing for identifying the position of the head of an occupant Hm using such a head model cylindrically simulating a human head as illustrated in FIG. 12 is generally performed. In this face position identification processing, for example, the following is carried out: the left and right ends of the face of the occupant Hm captured in a picture image PI are detected; and each part (eyes, mouth, nose, or the like in this example) present in the area sandwiched between the detected left and right ends and comprising the face is detected. In addition, the positional relation between the parts is identified and the center of the face of the occupant Hm in the picture image PI is detected to identify the position of the head of the occupant Hm.

In the state monitoring processing, the actuator part 50 is controlled in the following cases detected as the result of image processing: cases where the degree of arousal of the occupant Hm is lower than a predetermined threshold value (that is, the occupant Hm is drowsy); and cases where the occupant Hm takes his/her eyes off the road.

When the degree of arousal of the occupant Hm is lower than the threshold value, the actuator part 50 is controlled. Examples of this control are as follows: outputting a notification urging to take a rest from the notification part 51; vibrating the driver's seat DS or the steering wheel SH through the vibration part 52; blowing cold air on the occupant Hm through the air conditioning controller 53; and the like. When the occupant Hm takes his/her eyes off the road, the actuator part 50 is controlled. Examples of this control are as follows: outputting a voice notification from the notification part 51; vibrating the driver's seat DS or the steering wheel SH through the vibration part 52; and blowing cold air on the occupant Hm through the air conditioning controller 53.

<2.6 Effect of Second Embodiment>

In the state monitoring apparatus 1 in this embodiment, the projecting surface of each optical member 11 is configured so that more intense illumination light arrives at a constituent point farther away from the light emission parts 9.

Specifically, the inclined planes 81, 85 that are parts of the projecting surfaces of the optical members 11 are inclined along the perpendicular direction. These inclined planes 81, 85 make it possible to refract illumination light passing through the inclined planes 81, 85 and concentrate the illumination light on the center presence area. As a result, the light distribution characteristics of illumination light that implement the following can be achieved with the optical members 11: the distribution of the intensity of light incident on each pixel along the perpendicular direction of the image pickup predetermined area is within the second reference range.

In addition, each cylindrical surface 89 is provided as a part of the projecting surface of each optical member 11. Further, the inclined planes 81, 85 are inclined along the horizontal direction. The cylindrical surfaces 89 and the inclined planes 81, 85 make it possible to refract illumination light passing through the inclined planes 81, 85 and achieve the light distribution characteristics of illumination light with which: the illumination light is more intense in an area closer to the center presence area and is weaker in an area farther away from the center presence area in the horizontal direction.

This state monitoring apparatus 1 makes it possible to generate a picture image PI in which: the intensity of light incident on each pixel constituting the image pickup predetermined area is equal to or higher than the intensity reference value; and the distribution of the intensity of light incident on each pixel constituting the image pickup predetermined area is within the first reference range. That is, it is possible to cause the state monitoring apparatus 1 to generate the following picture images PI: picture images PI which are suitable for detecting the position of the face of an occupant Hm by state monitoring processing and, by extension, from which the state of the occupant Hm can be stably monitored.

Further, with the above-mentioned effect, the state monitoring apparatus 1 makes it possible to suppress light emission to useless areas as compared with conventional state monitoring apparatuses; therefore, the effect of illumination can be enhanced without increasing the number of light emitters. Consequently, as compared with conventional state monitoring apparatuses, the state monitoring apparatus 1 makes it possible to: suppress increase in the size of the entire state monitoring apparatus 1 as much as possible and suppress increase in the power consumed at the light emitters as much as possible.

In other words, the state monitoring apparatus 1 makes it possible to: project uniform illumination light having an intensity equal to or higher than the intensity reference value to the image pickup area as much as possible and suppress increase in the size of the entire apparatus as much as possible; and suppress increase in the power consumed at the floodlight projectors as much as possible.

The light distribution characteristics of each optical member 11 are designed so that illumination light is more intense in an area closer to the center presence area and weaker in an area farther away from the center presence area in the horizontal direction.

In a picture image PI generated under such light distribution characteristics, the shadows are more conspicuous; however, degradation in detection performance can be suppressed more than by forming an illumination distribution in any other axial direction. Therefore, the picture image PI matches the properties of head models used in face position identification processing.

In general, illumination light is attenuated in proportion to the distance. For example, in case of light distribution characteristics under which uniform illumination light arrives at a projection plane, the following takes place even at pixels that should intrinsically have equal brightness values: the brightness value varies depending on the distance from a light emission part to each constituent point or the distance from each constituent point to the light receptive surface of an image sensor.

For this reason, picture images generated by conventional technologies are highly contrasty even in the center presence area and there is a possibility that picture images PI from which the state of an occupant Hm cannot be stably monitored are formed.

Meanwhile, the state monitoring apparatus 1 makes it possible to generate picture images PI from which the state of an occupant Hm can be stably monitored.

In conventional state monitoring apparatuses, when a light emission part emits intense illumination light, a filter is discolored; this may make an occupant Hm feel uncomfortable.

Meanwhile, the state monitoring apparatus 1 is provided with a diffuser panel between each light emission part 9 and the optical member 13. For this reason, the state monitoring apparatus 1 makes it possible to reduce a possibility that an occupant Hm feels uncomfortable.

<2.7 Modification to Second Embodiment>

Up to this point, the description has been given to the second embodiment. The present disclosure is not limited to the above embodiment and can be variously embodied without departing from the subject matter of the present disclosure.

Some examples will be taken. The optical member 13 in the above embodiment includes the visible light cut filter 30, the shade 31, and the diffuser panels 37, 38; however, the configuration of the optical member 13 is not limited to this. As illustrated in FIG. 19, specifically, the optical member 13 may be configured so that the visible light cut filter 30 and the shade 31 are provided and the diffuser panels 37, 38 are omitted.

Furthermore, the optical member 13 itself may be omitted.

In the above embodiment, the number of the light emitter comprising one light emission part 9 is one; however, the number of the light emitter comprising one light emission part 9 is not limited to one. For example, one light emission part 9 may include a plurality of light emitters. In this case, it is desirable that the light emitters (LEDs) should be closely arranged and be caused to function as one light emitter.

Each light emission part 9 of the image pickup system 5 is formed of LED. However, the structure of the light emission part 9 is not limited to this and anything is acceptable as long as it is a light emitter emitting illumination light.

In the above embodiment, the installation position of the image pickup system 5 is the outer surface of the upper part of the steering column SC to which the steering wheel SH is connected; however, the installation position of the image pickup system 5 is not limited to this. For example, the installation position of the image pickup system 5 may be the vicinity of the inner rear view mirror in the vehicle compartment as illustrated in FIG. 11.

When the installation position of the image pickup system 5 is the vicinity of the inner rear view mirror in the vehicle compartment, the inclined planes 81, 85 of each optical member 11 are formed so that they have an inclination in the perpendicular direction so that: the height from the connecting face 68 to the inclined planes 81, 85 is increased as it goes farther away from the headlining board of the host vehicle AM; and the height from the connecting face 68 to the inclined plane 81, 85 is reduced as it goes closer to the headlining board of the host vehicle AM.

The installation position of the image pickup system 5 may be on the dashboard, on the surface of a meter, inside a meter, or the like. That is, each optical member 11 may be configured in any way as long as the following can be implemented as described in connection with the above embodiment: the intensity of illumination light arriving at the projection plane is equal to or higher than a reference value defined as a value corresponding to the intensity reference value; and more intense illumination light arrives at a constituent point farther away from the light emission parts 9.

In the above embodiment, the object in which the state monitoring apparatus 1 is installed is an automobile; however, the object in which the state monitoring apparatus 1 is installed is not limited to an automobile. The state monitoring apparatus 1 may be installed on a bicycle or in rolling stock. That is, the state monitoring apparatus 1 may be installed in anything as long as it is a vehicle.

<2.8 Aspect of Disclosure of Second Embodiment>

The following is a description of an aspect of the disclosure of the second embodiment. As an aspect of the disclosure, in a state monitoring apparatus, at least one light emission device projects illumination light containing at least a near infrared wavelength to a predetermined area. The predetermined area is defined beforehand from eyellipse or the like as an area where the face of an occupant is positioned in the space in the vehicle compartment of the host vehicle in terms of design. An area in the vehicle compartment including a predetermined area is taken as an image pickup area; and an image pickup device forms an image from the light incident from the image pickup area by an image sensor having a plurality of pixels and thereby generates a picture image. Based on the result of processing the picture image generated at the image pickup device, a state monitoring device detects and estimates the state of an occupant of the host vehicle and carries out actuation according to the state.

Further, the state monitoring apparatus according to this aspect includes an optical device. This optical device includes an incident part and a projecting part.

The incident part collects illumination light emitted at each light emission device. The projecting part distributes light at a projecting surface from which the illumination light collected at each incident part is projected to the space in the vehicle compartment so that the following is implemented: the intensity of light of incident on each pixel constituting an image pickup predetermined area is equal to or higher than an intensity reference value; and the distribution of the intensity of light incident on each pixel constituting the image pickup predetermined area is within a predetermined first reference range. The image pickup predetermined area is an area that is at least a part of the light receptive surface of the image sensor of the image pickup device. The image pickup predetermined area is an area on the image sensor corresponding to the predetermined area. The intensity reference value is predetermined as the intensity of light with which a picture image suitable for image processing at the state monitoring device is obtained.

The distribution cited here includes at least controlled variation.

The state monitoring apparatus according to this aspect makes it possible to implement the following: the intensity of light incident on each pixel constituting the image pickup predetermined area is equal to or higher than the intensity reference value; and the distribution of the intensity of light incident on each pixel constituting the image pickup predetermined area is within the first reference range. That is, with the state monitoring apparatus according to this aspect, the following can be implemented without increasing the number of light emission devices in conventional state monitoring apparatus: picture images from which the state of an occupant can be stably monitored can be generated.

As a result, the state monitoring apparatus according to this aspect makes it possible to implement the following as compared with conventional state monitoring apparatuses: increase in the size of the entire state monitoring apparatus is suppressed as much as possible and increase in the power consumed at the light emission devices is suppressed as much as possible.

In other words, the state monitoring apparatus according to this aspect makes it possible to: project illumination light having an intensity equal to or higher than the intensity reference value and minimum necessary uniformity to the image pickup area as much as possible; and suppress increase in the power consumed at the floodlight projectors as much as possible.

Each part (eyes, nose, mouth, and the like) of the face of an occupant present in the predetermined area is probably located in a position irradiated with illumination light projected from a light emission device. When this illumination light is projected to the face, the light is reflected from the face. When the distance from the light source in the light emission device to the point at which the light is reflected is long, the following takes place: when the illumination light is scattered light that is not coherent, the light reflected at the point is scattered and thereby attenuated until it is incident on the light receptive surface of an image sensor.

In consideration of the intensity of this attenuated light, the projecting part according to this aspect may distribute light so that the following takes place with respect to each part of the face of an occupant that is probably present in the predetermined area: more intense illumination light arrives at a constituent point farther away from the light source in the light emission device.

Usually, light is attenuated inversely with the square of the distance. Therefore, it is advisable that the optical control device according to this aspect should be designed with the distribution of intensity corresponding to the distance taken into account so that the following is implemented: the optical control device distributes light so that predetermined light arrives at the image pickup predetermined area.

The attenuation of light is influenced by not only distance but also the amount of ambient light of an image pickup system lens. Specifically, when light identical in brightness from an identical distance is incident on an image sensor from different angles, the intensity of light arriving at the center of the image sensor is higher than the intensity of light arriving at the peripheral area. For this reason, the optical control device according to this aspect may distribute light so that it is intensified according to the distance from the optical center with the light amount ratio taken into account (the light distribution may be corrected). Light may be significantly attenuated by the influence of surface reflection depending on the angle of incidence on the image pickup lens. Therefore, with respect to the optical control device according to this aspect, it is effective to carry out control so that the light distribution characteristics with the foregoing taken into account are obtained.

With this projecting part, the following can be implemented with respect to picture images processed at the state monitoring device: the intensity of light incident on each pixel constituting the image pickup predetermined area is equal to or higher than the intensity reference value; and the distribution of the intensity of light incident on each pixel constituting the image pickup predetermined area is within the first reference range.

However, the picture image described above is a picture image acquired when an occupant or the like is not present in the predetermined area. In this picture image, the following takes place when an occupant is present in the predetermined area: body parts, such as, for example, eyebrows, low in reflection coefficient and body parts, such as noseholes, that are shadowed with respect to the optical axis of projected light are locally darkened. This leads to a highly contrasty picture image. This picture image is more suitable for image processing.

In this aspect, the following measure may be taken: an area in the predetermined area where the center of the face of an occupant is probably positioned is taken as a center presence area; and an area in the light receptive surface corresponding to the center presence area is taken as the image pickup predetermined area. In this case, the projecting part according to this aspect may distribute light to the center presence area so that the following is implemented: the distribution of the intensity of illumination light in the perpendicular direction is within a second reference range predetermined as a range in which the distribution can be considered as uniform.

This projecting part makes it possible to make uniform the distribution of brightness values in the pixels along the vertical direction among the pixels constituting the center image pickup area as compared with those along the other directions than vertical. The vertical direction cited here refers to a direction including a direction perpendicular to the horizontal plane and further including a predetermined range of angle from a vertical axis to the horizontal plane.

It is desirable that the center presence area according to this aspect should be the following area: an area embracing an area where the entire face is not out of the image pickup predetermined area when the eyes are present in an ellipse defined as different eyellipses depending on the type of the vehicle. To determine the size of a face relative to the eye position, A2: Head breadth, A15: Morphologic face height, and A36: Total head height of "Anthropometrical Database (http://riodb.ibase.aist.go.jp/dhbodydb/91-92/)" released from AIST and the like can be referred to.

In such a state monitoring apparatus, as image processing by the state monitoring device, usually, the following detection is carried out: the detection of the face direction of an occupant; the detection of the drowsiness of an occupant; the detection of the line of sight of an occupant; and the like. To carry out any of these detection methods, it is required to detect the face of the occupant and at least one of the facial parts (eyes, nose, mouth, and the like).

In processing to detect the face direction of an occupant, usually, a head model simulating a human head is used. The head model may be a three-dimensional model taken as the standard face using the above-mentioned anthropometrical database or the like or may be represented as a simple cylindrical model as shown in FIG. 12. A cylindrical model irradiated with light usually has the properties that it is brighter as it goes closer to the central axis and is darker as it goes farther away from the central axis in the radial direction. Thus the cylindrical model is clear in contrast; this is taken into account by detection algorithms (or preprocessing).

Consequently, the projecting part according to this aspect may distribute light so that the following is implemented: the illumination light is more intense in an area closer to the center presence area and is weaker in an area farther away from the center presence area in the horizontal direction.

This light distribution makes the contrast more conspicuous but it makes it possible to suppress degradation in the detection performance more than in contrasty picture images which forms an illumination distribution in any other axial direction.

The light distribution accomplished by this projecting part matches the properties of head models. As a result, it is possible to generate a picture image suitable for image processing at the state monitoring device without projecting illumination light more intense than necessary to the entire image pickup area. The horizontal direction cited here includes a direction parallel to the horizontal plane and further includes a direction within a predetermined range of angle from a horizontal axis with respect to the horizontal plane.

The optical device can be formed of an optical member obtained by connecting a projecting part to a connecting face that is a plane formed in the incident part.

When the optical device is formed of the optical member, the projecting part may be provided with a cylindrical lens. This cylindrical lens has a cylindrical shape as at least a part of the projecting surface and placed on the connecting face so that the axis thereof in the axial direction agrees with the perpendicular direction of the host vehicle. Further, the projecting part may be provided with at least one prism formed in the shape of triangle pole and placed on the connecting face so that the following is implemented: one face of the a plurality of faces thereof is at least a part of the projecting surface and one face of the plurality of faces thereof is an inclined plane inclined along the perpendicular direction.

This aspect may be embodied as an optical member used in a state monitoring apparatus including at least one light emission device, image pickup device, and state monitoring device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A state monitoring apparatus mounted in a vehicle to monitor a state of an occupant who is a driver of the vehicle, comprising:
    at least one light emission part that emits light to project illumination light having a wavelength including at least a near infrared wavelength to a predetermined area that is defined as an area where a face of the occupant being the driver of the vehicle is positioned in space in a compartment of the vehicle;
    an image pickup part that generates a picture image by receiving light incident from the predetermined area with an image sensor having a plurality of pixels;
    a state monitoring section that monitors a state of the occupant being the driver based on a result of processing the picture image generated by the image pickup part; and
    an optical control part that controls light distribution
        to cause an intensity of light incident on each pixel included in an image pickup predetermined area
            to be equal to or greater than an intensity reference value that is predetermined as an intensity of light providing a picture image suitable for image processing by the state monitoring section and
        to cause a distribution of the intensity of light incident on each pixel included in the image pickup predetermined area
            to be within a predetermined first reference range,
        the image pickup predetermined area
            being at least a part of a light receptive surface of the image sensor in the image pickup part, and
            corresponding to the predetermined area,
    wherein:
    the predetermined area includes a center presence area where a central axis of the face of the occupant being the driver is probably positioned, while the image pickup predetermined area includes an area corresponding to the center presence area, in the light receptive surface; and the optical control part controls the light distribution in the center presence area such that
  (i) a distribution of the intensity of the illumination light along a perpendicular direction is to be uniform, whereas
  (ii) a distribution of the intensity of the illumination light along a horizontal direction is
    to be greater to arrive at an area closer to the center presence area, and
    to be smaller to arrive at an area farther away from the center presence area.

2. The state monitoring apparatus according to claim 1, wherein the optical control part controls the light distribution
  to cause the illumination light having a greater intensity
    to arrive at a point farther away from the light source of the light emission part among points in the face of the occupant that is possibly present in the predetermined area.

3. The state monitoring apparatus according to claim 1, wherein the optical control part includes at least one optical element.

4. The state monitoring apparatus according to claim 1, wherein the light emission part individually includes a floodlight projector that emits the illumination light, and
wherein the optical control part is a plurality of the floodlight projectors that are arranged
  to cause the illumination light having a greater intensity
    to arrive at a point farther away from a light source in the light emission part among points in the face of the occupant probably present in the predetermined area.

5. The state monitoring apparatus according to claim 1, wherein:
the at least one light emission part includes a plurality of floodlight projectors that each emit the illumination light having high rectilinearity;
the plurality of the floodlight projectors function as the optical control part;
the plurality of the floodlight projectors are arranged to cause the illumination light having a greater intensity to arrive at a point farther away from a light source in the light emission part, the point being among points in the face of the occupant probably present in the predetermined area; and
the plurality of floodlight projectors are arranged more densely in the perpendicular direction than in the horizontal direction to cause the distribution of the intensity of the illumination light along the perpendicular direction to be uniform.

6. The state monitoring apparatus according to claim 1, further comprising:
a position determination section that determines whether or not a position where the face of the occupant is present is within the predetermined area; and
a brightness correcting section that performs correction control
  to increase, when a result of determination at the position determination section reveals that the position where the face of the occupant is present is out of the predetermined area, a brightness value of each pixel in an area in the picture image corresponding to the position where the face of the occupant is present is increased to provide a picture image after the correction control,
wherein the picture image after the correction control by the brightness correcting section is taken as the picture image generated by the image pickup part.

7. The state monitoring apparatus according to claim 6, wherein the brightness correcting section performs the correction control when the picture image is generated by the image pickup part.

8. The state monitoring apparatus according to claim 6, wherein the brightness correcting section performs the correction control against the picture image that was generated by the image pickup part.

9. The state monitoring apparatus according to claim 1, further comprising:
a filter portion that is placed on a path of the illumination light from the light emission part to the predetermined area, the filter portion having a filter that lets through light having a wavelength including a near infrared wavelength; and
an incidence reduction part that reduces light incident on the image sensor through the filter portion.

10. The state monitoring apparatus according to claim 9, wherein the incidence reduction part is an attenuating portion that is placed in the filter and attenuates the illumination light propagating in the filter.

11. The state monitoring apparatus according to claim 1, wherein
the optical control part includes
  an incident part that collects the illumination light projected by the light emission part, and
  a projecting part that performs, at a projecting surface, light distribution that projects the illumination light collected by the incident part to the space in the compartment
    to cause the intensity of light incident on each pixel included in the image pickup predetermination area,
wherein the optical control part is an optical member including the projecting part that is connected to a connecting face that is a plane formed in the incident part.

12. A state monitoring apparatus mounted in a vehicle to monitor a state of an occupant who is a driver of the vehicle, comprising:
at least one light emission part that emits light to project illumination light having a wavelength including at least a near infrared wavelength to a predetermined area that is defined as an area where a face of the occupant being the driver of the vehicle is positioned in space in a compartment of the vehicle;
an image pickup part that generates a picture image by receiving light incident from the predetermined area with an image sensor having a plurality of pixels;
a state monitoring section that monitors a state of the occupant being the driver based on a result of processing the picture image generated by the image pickup part; and
an optical control part that includes
  an incident part that collects the illumination light projected by the light emission part, and
  a projecting part that performs, at a projecting surface, light distribution that projects the illumination light collected by the incident part to the space in the compartment to cause an intensity of light incident on each pixel included in an image pickup predetermined area to be equal to or greater than an intensity reference value predetermined as an intensity of light providing a picture image suitable for image processing by the state monitoring section and to cause a distribution of the intensity of light incident on each pixel included in the image pickup predetermined area to be within a predetermined first reference range, the image pickup predetermined area being at least a part of a light receptive surface of the image sensor in the image pickup part and corresponding to the predetermined area, wherein the optical control part is an optical member including the projecting part that is connected to a connecting face that is a plane formed in the incident part.

13. The state monitoring apparatus according to claim 12, wherein the projecting part performs light distribution to cause the illumination light having a greater intensity to arrive at a constituent point farther away from the light emission part among constituent points that are a plurality of fine areas included in a plane where the face of the occupant is probably present in the predetermined area.

14. The state monitoring apparatus according to claim 12, wherein the predetermined area includes a center presence area where a central axis of the face of the occupant is probably positioned, and wherein the projecting part performs the light distribution to permit the center presence area to have a distribution of the intensity of the illumination light along a perpendicular direction, the distribution being within a second reference range that is predetermined as a range providing the distribution to be uniform.

15. The state monitoring apparatus according to claim 14, wherein the projecting part controls the light distribution to cause the illumination light having a greater intensity to arrive at an area closer to the center presence area, and to cause the illumination light having a smaller intensity to arrive at an area farther away from the center presence area in a horizontal direction.

16. The state monitoring apparatus according to claim 12, wherein the projecting part includes a cylindrical lens placed on the connecting face, the cylindrical lens having a cylindrical surface that is at least a part of the projecting surface and an axial direction that is along a perpendicular direction of the vehicle.

17. The state monitoring apparatus according to claim 12, wherein the projecting part includes at least one prism shaped of triangular pole and placed on the connecting face, the prism having a plurality of faces including one face being at least a part of the projecting surface and one face being an inclined plane inclined along a perpendicular direction.

18. The state monitoring apparatus according to claim 12, wherein the projecting part includes:

a cylindrical lens placed on the connecting face, the cylindrical lens having a cylindrical surface being at least a part of the projecting surface and an axial direction along a perpendicular direction of the vehicle; and two prisms shaped of triangular pole and placed on the connecting face, each prism having a plurality of faces including one face being at least a part of the projecting surface and one face being an inclined plane inclined along a perpendicular direction, wherein the two prisms are arranged to cause the cylindrical lens to be sandwiched between the two prisms.

19. The state monitoring apparatus according to claim 17, wherein the inclined plane is inclined along a horizontal direction to have a height from the connecting face, the height being increased as it goes closer to a center of the projecting part.

20. The state monitoring apparatus according to claim 12, wherein the incident part includes:

a salient part that is shaped of cone, permits part of illumination light from the light emission part to pass through, and guides part of illumination light having passed through to the projecting part;

a guiding part that is shaped of ring to surround the salient part circumferentially, the guiding part having a transmitting plane permitting part of illumination light from the light emission part to pass through; and a reflecting part that is shaped of cylinder having a diameter that is increased from a plane where the salient part and the guiding part are extended to the connecting face, and a reflecting side face that reflects and guides at least part of the illumination light having passed through the transmitting plane of the guiding part to the projecting part.

21. The state monitoring apparatus according to claim 20, wherein the reflecting side face of the reflecting part is shaped of a curved surface that totally reflects the illumination light having passed through the transmitting plane of the guiding part.

22. The state monitoring apparatus according to claim 12, further comprising:

a filter portion that is placed on a path of the illumination light from the light emission part to the predetermined area, the filter portion having a filter letting through the illumination light; and a diffuser part that is placed between the optical control part and the filter portion and diffuses illumination light having passed through the optical control part.

23. An optical member used in a state monitoring apparatus that is mounted in a vehicle and includes at least one light emission part that emits light to project illumination light having a wavelength including a near infrared wavelength to a predetermined area defined as an area where a face of an occupant of the vehicle is positioned in space in a compartment of the vehicle, an image pickup part that generates a picture image by receiving light incident from the predetermined area with an image sensor having a plurality of pixels, and a state monitoring section that monitors a state of the occupant based on a result of processing the picture image generated by the image pickup part, the optical member comprising:

an incident part that collects illumination light emitted projected by the light emission part; and a projecting part that performs, at a projecting surface, light distribution that projects the illumination light collected by the incident part to the space in the compartment, the projecting part being connected to a connecting face that is a plane formed in the incident part,
   to cause an intensity of light incident on each pixel included in an image pickup predetermined area
      to be equal to or greater than an intensity reference value predetermined as an intensity of light providing a picture image suitable for image processing by the state monitoring section and
   to cause a distribution of the intensity of light incident on each pixel included in the image pickup predetermined area
      to be within a predetermined first reference range,
the image pickup predetermined area
being at least a part of a light receptive surface of the image sensor in the image pickup part and
corresponding to the predetermined area.

\* \* \* \* \*